US012811133B2

(12) United States Patent
Wu et al.

(10) Patent No.: US 12,811,133 B2
(45) Date of Patent: Nov. 24, 2026

(54) COMPOSITIONS FOR USE IN NEGATIVE ELECTRODES

(71) Applicant: SICONA BATTERY TECHNOLOGIES PTY LTD, North Wollongong (AU)

(72) Inventors: Tianyu Wu, St. Paul, MN (US); Mark J. Pellerite, Woodbury, MN (US); Kevin W. Eberman, St. Paul, MN (US); Xiaohua Ma, Woodbury, MN (US); Li Liu, Woodbury, MN (US)

(73) Assignee: SICONA BATTERY TECHNOLOGIES PTY LTD, North Wollongong (AU)

( * ) Notice: Subject to any disclaimer, the term of this patent is extended or adjusted under 35 U.S.C. 154(b) by 504 days.

(21) Appl. No.: 18/396,093

(22) Filed: Dec. 26, 2023

(65) Prior Publication Data

US 2024/0128436 A1 Apr. 18, 2024

Related U.S. Application Data

(63) Continuation of application No. 16/609,332, filed as application No. PCT/US2018/032501 on May 14, 2018, now abandoned.

(Continued)

(51) Int. Cl.

*H01M 4/134* (2010.01)
*H01M 4/04* (2006.01)

(Continued)

(52) U.S. Cl.

CPC ......... *H01M 4/134* (2013.01); *H01M 4/0452* (2013.01); *H01M 4/0466* (2013.01); *H01M 4/137* (2013.01); *H01M 4/1399* (2013.01); *H01M 4/386* (2013.01); *H01M 4/587* (2013.01); *H01M 4/602* (2013.01); *H01M 4/622* (2013.01);

(Continued)

(58) Field of Classification Search

CPC .. H01M 4/134; H01M 4/0452; H01M 4/0466; H01M 4/137

See application file for complete search history.

(56) References Cited

U.S. PATENT DOCUMENTS 6,664,004 B2 12/2003 Krause et al.
6,680,145 B2 1/2004 Obrovac et al.

(Continued)

FOREIGN PATENT DOCUMENTS

JP 2001-185127 A 7/2001
JP 2010-129363 A 6/2010

(Continued)

OTHER PUBLICATIONS

English translation of Notification of Second Office Action issued in Chinese Patent Application No. 201880046808.X dated Apr. 22, 2023.

(Continued)

*Primary Examiner* — Olatunji A Godo
(74) *Attorney, Agent, or Firm* — BakerHostetler

(57) ABSTRACT

A negative electrode composition includes a silicon containing material and a crosslinked polymer containing coating surrounding at least a portion of the silicon containing material. The crosslinked polymer containing coating comprises a (co)polymer derived from polymerization of one or more vinylic monomers comprising a carboxyl or carboxylate group.

16 Claims, 3 Drawing Sheets

Related U.S. Application Data

(60) Provisional application No. 62/508,373, filed on May 18, 2017.

(51) Int. Cl.

| | |
|---|---|
| ***H01M 4/137*** | (2010.01) |
| ***H01M 4/1399*** | (2010.01) |
| ***H01M 4/38*** | (2006.01) |
| ***H01M 4/587*** | (2010.01) |
| ***H01M 4/60*** | (2006.01) |
| ***H01M 4/62*** | (2006.01) |
| ***H01M 10/0525*** | (2010.01) |
| *H01M 4/02* | (2006.01) |

(52) U.S. Cl.
CPC .. *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 7,871,727 | B2 | 1/2011 | Obrovac et al. |
| 7,906,238 | B2 | 3/2011 | Le |
| 8,071,238 | B2 | 12/2011 | Le |
| 8,669,008 | B2 | 3/2014 | Cho et al. |
| 8,753,545 | B2 | 6/2014 | Obrovac et al. |
| 2008/0187838 | A1 | 8/2008 | Le |
| 2008/0206641 | A1 | 8/2008 | Christensen et al. |
| 2009/0087748 | A1 | 4/2009 | Choi et al. |
| 2011/0215280 | A1 | 9/2011 | Obrovac |
| 2012/0115046 | A2 | 5/2012 | Mak et al. |
| 2012/0270103 | A1 | 10/2012 | Lee et al. |
| 2014/0038049 | A1 | 2/2014 | Chung |
| 2014/0205904 | A1 | 7/2014 | Sasaki |
| 2014/0242461 | A1 | 8/2014 | Hwang et al. |
| 2015/0064552 | A1 | 3/2015 | Huang et al. |
| 2015/0072235 | A1 | 3/2015 | Hong et al. |
| 2016/0093879 | A1 | 3/2016 | Song et al. |
| 2016/0111718 | A1 | 4/2016 | Figgemeier |
| 2017/0012283 | A1 | 1/2017 | Mizuno |
| 2017/0040599 | A1 | 2/2017 | Kamo et al. |
| 2017/0040612 | A1 | 2/2017 | Komaba et al. |

FOREIGN PATENT DOCUMENTS

| | | | |
|---|---|---|---|
| JP | 2015-90845 | A | 5/2015 |
| JP | 2015-103449 | A | 6/2015 |
| JP | 2015-106437 | A | 6/2015 |
| KR | 20150060513 | A | 6/2015 |
| WO | 98/043039 | A1 | 10/1998 |
| WO | 2008/097723 | A1 | 8/2008 |
| WO | 2015/163302 | A | 10/2015 |
| WO | 2016/089811 | A1 | 6/2016 |
| WO | 2017/073589 | A1 | 5/2017 |

OTHER PUBLICATIONS

Angew. Chem. Int. Ed., 51: 8762-8767.

PCT/US2018/032501, International Search Report dated Aug. 1, 2018.

PCT/US2018/32501, Written Opinion dated Aug. 1, 2018.

COMPOSITIONS FOR USE IN NEGATIVE ELECTRODES

CROSS-REFERENCE TO RELATED APPLICATIONS

This application is a continuation of U.S. patent application Ser. No. 16/609,332 filed Oct. 29, 2019; which is the National Stage Application of International Patent Application No. PCT/US2018/032501, filed May 14, 2018; which claims the benefit of U.S. Provisional Patent Application No. 62/508,373, filed May 18, 2017. All foregoing applications are incorporated herein by reference in their entireties for any and all purposes.

FIELD

The present disclosure relates to compositions useful in negative electrodes for electrochemical cells (e.g, lithium-ion batteries) and methods for preparing and using the same.

BACKGROUND

Various components have been introduced for use in the negative electrodes of lithium-ion batteries. Such components are described, for example, in, U.S. Pat. App. Pub. 2008/0187838, U.S. Pat. App. Pub. 2009/0087748, U.S. Pat. App. Pub. 2012/0270103, U.S. Pat. No. 8,669,008, U.S. Pat. App. Pub. 2014/0242461, U.S. Pat. App. Pub. 2016/0093879, U.S. Pat. App. Pub. 2015/0064552, U.S. Pat. App. Pub. 2017/0040599, Angew. Chem. Int. Ed., 51: 8762-8767, KR 20150060513, and JP 2015103449.

SUMMARY

In some embodiments, a negative electrode is provided. The negative electrode includes a silicon containing material; and a crosslinked polymer containing coating surrounding at least a portion of the silicon containing material. The crosslinked polymer containing coating comprises a (co) polymer derived from polymerization of one or more vinylic monomers comprising a carboxyl or carboxylate group.

The above summary of the present disclosure is not intended to describe each embodiment of the present disclosure. The details of one or more embodiments of the disclosure are also set forth in the description below. Other features, objects, and advantages of the disclosure will be apparent from the description and from the claims.

BRIEF DESCRIPTION OF THE DRAWINGS

The disclosure may be more completely understood in consideration of the following detailed description of various embodiments of the disclosure in connection with the accompanying figures, in which.

DETAILED DESCRIPTION

Figure 1:
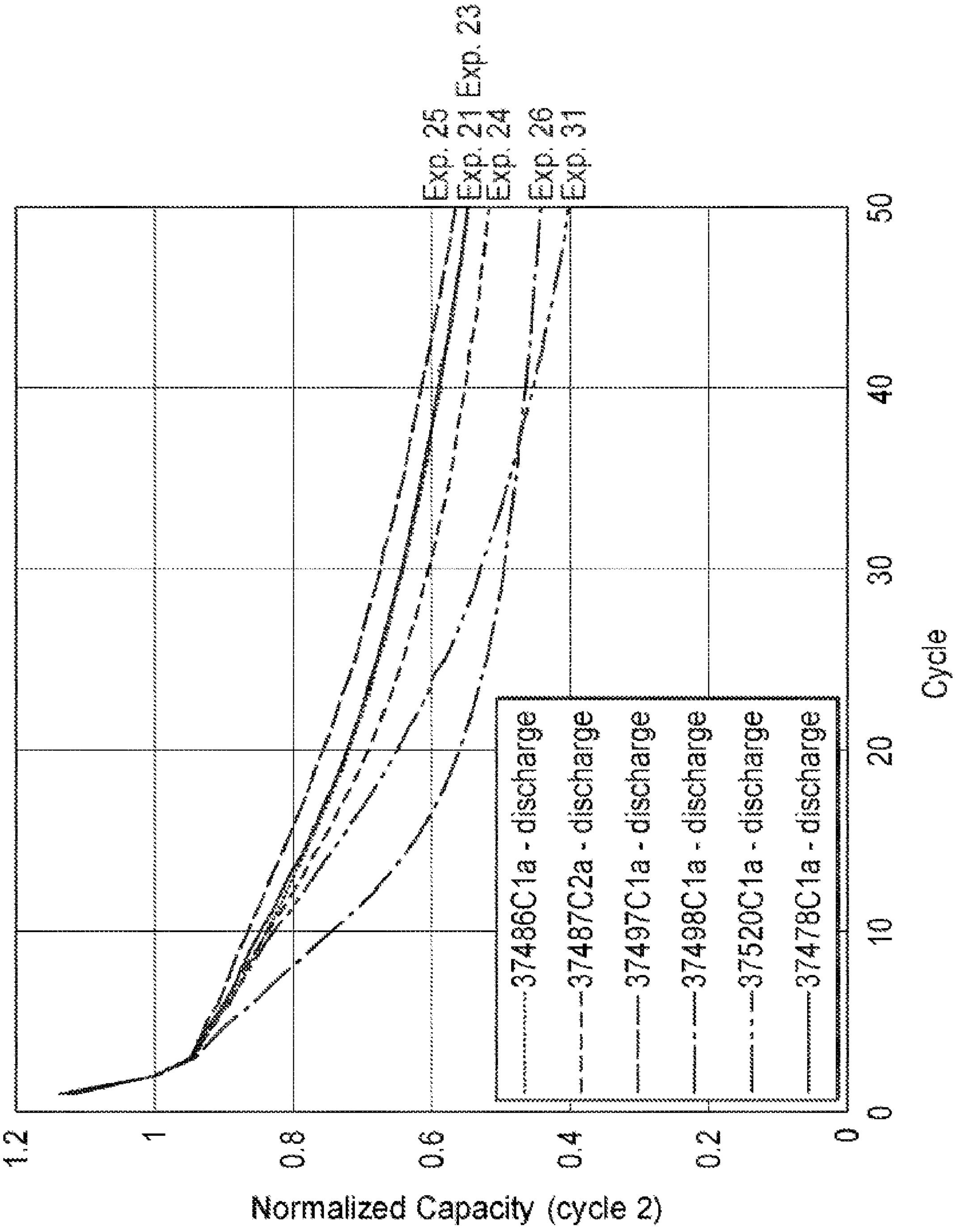
FIG. 1 is a graph of results of electrochemical cycling for lithium half-cells prepared using embodiments of the present disclosure.

Electrochemical energy storage has become a critical technology for a variety of applications, including grid storage, electric vehicles, and portable electronic devices. Lithium-ion battery (LIB) is a viable electrochemical energy storage system because of its relatively high energy density and good rate capability. In order for industry relevant battery applications, such as electric vehicles, to be commercially viable on a large scale, it is desirable for the cost of the lithium ion battery chemistry to be lowered.

High-energy-density anode materials based on silicon have been identified as a means to reduce cost and improve energy density of lithium ion batteries for applications such as electric vehicles and handheld electronics. Certain silicon alloy materials offer good particle morphology (optimized particle size, low surface area) and high first-cycle efficiency, resulting in higher-energy cells (based on both volumetric (Wh/L) and weight (Wh/kg) energy density). In order to achieve maximum Wh/L, the weight percent of silicon alloy in the anode should be maximized.

Certain silicon alloys, for example, with capacities greater than 1100 mAh/gram and densities of approximately 3.4 g/cc, undergo significant volume change (up to approximately 140% or more) during charge and discharge cycles. Binders selection, such as those commonly used with graphite anodes (e.g., poly(vinylidene fluoride) and styrene-butadiene-rubber/sodium carboxymethyl-cellulose (SBR/Na-CMC), alone, have not proven to adequately address the volume change issue in anodes containing more than about 15 weight % silicon alloy.

Various attempts have been made to address the challenges of using high-energy-density anode materials based on silicon. For example, the use of certain polymers as binders in conjunction with the silicon materials has been described. However, each of these attempts have uncovered further challenges that, heretofore, have prevented technologies from fully enabling the use of high-energy-density anode materials based on silicon in commercial batteries. For example, some polymers have been observed as being too brittle, too hydrophilic, or exhibiting insufficient adhesion. Or, for example, some polymers contributed to a high irreversible-capacity, reduced capacity, or reduced power-capability. Still further, it has been observed that many of these materials do not remain in contact with the silicon based anode materials when mixed in the slurry that is used to coat the anode materials onto a current collector, or when the battery is cycled.

Various other attempts have been made to address the above-mentioned challenges of using high-energy-density anode materials based on silicon through the application of polymer coating layers on the surfaces of the active materials. However, each of these attempts have also posed challenges that, heretofore, have prevented technologies from fully enabling the use of high-energy-density anode materials based on silicon in commercial batteries. For example, the polymers have been observed as being unstable or soluble in slurry components typically employed in anode formulation. Or, for example, they also contribute to a high irreversible-capacity, reduced capacity, or reduced power-capability. Generally, the present disclosure is directed to overcoming these numerous challenges.

As used herein, the term "(co)polymer" refers to homo- and copolymers;

the term "(meth)acrylic acid" refers to acrylic acid or methacrylic acid;

the term "(meth)acrylate" refers to acrylate or methacrylate;

the term "(meth)acrylamide" refers to acrylamide or methacrylamide;

the terms "lithiate" and "lithiation" refer to a process for adding lithium to an electrode material or electrochemically active phase;

the terms "delithiate" and "delithiation" refer to a process for removing lithium from an electrode material or electrochemically active phase;

the terms "charge" and "charging" refer to a process for providing electrochemical energy to a cell;

the terms "discharge" and "discharging" refer to a process for removing electrochemical energy from a cell, e.g., when using the cell to perform desired work;

the phrase "charge/discharge cycle" refers to a cycle wherein an electrochemical cell is fully charged, i.e. the cell attains its upper cutoff voltage and the anode is at about 100% state of charge, and is subsequently discharged to attain a lower cutoff voltage and the anode is at about 100% depth of discharge;

the phrase "positive electrode" refers to an electrode (often called a cathode) where electrochemical reduction and lithiation occurs during a discharging process in a full cell;

the phrase "negative electrode" refers to an electrode (often called an anode) where electrochemical oxidation and delithiation occurs during a discharging process in a full cell;

the phrase "electrochemically active material" refers to a material, which can include a single phase or a plurality of phases, that can electrochemically react or alloy with lithium under conditions possibly encountered during charging and discharging in a lithium ion battery (e.g., voltages between 0 V and 2 V versus lithium metal);

the term "alloy" refers to a material that includes two or more of any or all of metals, metalloids, or;

the phrase "catenated heteroatom" means an atom other than carbon (for example, oxygen, nitrogen, or sulfur) that is bonded to carbon atoms in a carbon chain so as to form a carbon-heteroatom-carbon chain; and As used herein, the singular forms "a", "an", and "the" include plural referents unless the content clearly dictates otherwise. As used in this specification and the appended embodiments, the term "or" is generally employed in its sense including "and/or" unless the content clearly dictates otherwise.

As used herein, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

In some embodiments, the present disclosure relates to electrode compositions suitable for use in secondary electrochemical cells (e.g., lithium ion batteries). Generally, the electrode compositions (e.g., negative electrode compositions) may include an electrochemically active material that includes (i) a silicon containing material; and (ii) a crosslinked polymer containing coating disposed on a surface of the alloy material (e.g., on an external surface of particles of the silicon containing material).

In some embodiments, the electrochemically active material may include a silicon containing material. The silicon containing material may include elemental silicon, silicon oxide, silicon carbide, or a silicon containing alloy. In some embodiments, the silicon containing material may have a volumetric capacity greater than 1000, 1500, 2000, or 2500 mAh/ml; or a capacity ranging from 1000 to 5500 mAh/ml, 1500 to 5500 mAh/ml, or 2000 to 5000 mAh/ml. For purposes of the present disclosure, volumetric capacity is determined from the true density, measured by Pycnometer, multiplied by the first lithiation specific capacity at C/40 rate to 5 mV versus lithium. This first lithiation specific capacity can be measured by forming an electrode having 90 weight % of the active material and 10% of lithium polyacrylate binder with 1 to 4 mAh/cm$^2$, building a cell with lithium metal as the anode and a conventional electrolyte (e.g., 3:7 EC:EMC with 1.0 M LiPF6), lithiating the anode at about a C/10 rate to 5 mV versus lithium, and holding 5 mV to C/40 rate.

In embodiments in which the silicon containing material includes a silicon containing alloy, the silicon containing alloy may have the formula: $Si_xM_yC_z$, where x, y, and z represent atomic % values and (a) $x+y+z=100\%$; (b) $x>2y+z$; (c) x and y are greater than 0; z is equal to or greater than 0; (d) M is iron and optionally one or more other metals selected from manganese, molybdenum, niobium, tungsten, tantalum, copper, titanium, vanadium, chromium, nickel, cobalt, zirconium, yttrium, or combinations thereof. In some embodiments, $65\%\leq x\leq 85\%$, $70\%\leq x\leq 80\%$, $72\%\leq x\leq 74\%$, or $75\%\leq x\leq 77\%$; $5\%\leq y\leq 20\%$, $14\%\leq y\leq 17\%$, or $13\%\leq y\leq 14\%$; and $5\%\leq z\leq 15\%$, $5\%\leq z\leq 8\%$, or $9\%\leq z\leq 12\%$. In some embodiments, x, y, and z are greater than 0.

In some embodiments, the silicon containing material may take the form of particles. The particles may have an average particle size that is no greater than 60 μm, no greater than 40 μm, no greater than 20 μm, or no greater than 10 μm or even smaller; at least 0.5 μm, at least 1 μm, at least 2 μm, at least 5 μm, or at least 10 μm or even larger; or 0.5 to 10 μm, 1 to 10 μm, 2 to 10 μm, 40 to 60 μm, 1 to 40 μm, 2 to 40 μm, 10 to 40 μm, 5 to 20 μm, 10 to 20 μm, 1 to 30 μm, 1 to 20 μm, 1 to 10 μm, 0.5 to 30 μm, 0.5 to 20 μm, or 0.5 to 10 μm. As used herein, the "average particle size" refers to the average diameter (or average length of longest dimension) of the particles as measured by laser diffraction. Generally, it is observed that the particle size distribution of the silicon-containing active material may exhibit polydispersity, characterized by the quantities of D10, D50, D90. These values represent the particle sizes above which 10, 50, and 90%, respectively, of the total volume of particles are present. In some embodiments, D10 is at least 0.5 μm, at least 1.0 μm, at least 1.5 μm, at least 2 μm, at least 2.5 μm, at least 3.0 μm, or at least 5.0 μm; D50 is no greater than 20 μm, no greater than 10 μm, no greater than 7 μm, no greater than 5 μm, or no greater than 3 μm; and D90 is no greater than 50 μm, no greater than 40 μm, no greater than 30 μm, no greater than 25 μm, no greater than 20 μm, no greater than 15 μm, or no greater than 10 μm. As used herein, the particle size distributions D10, D50, D90 are measured by laser diffraction in water, using the methods described in the Examples section of the present disclosure with a Horiba LA-960 instrument.

In some embodiments the silicon containing material may take the form of particles having low surface area. The particles may have a surface area that is less than 20 m$^2$/g, less than 12 $m^2/g$, less than 10 $m^2/g$, less than 5 $m^2/g$, less than 4 $m^2/g$, or even less than 2 $m^2/g$.

In embodiments in which the silicon containing material includes a silicon containing alloy, each of the phases of the silicon containing alloy (i.e., active phase, inactive phase, or any other phase of the alloy material) may include or be in the form of one or more grains. In some embodiments, the Scherrer grain size of each of the phases of the silicon containing alloy is no greater than 50 nanometers, no greater than 20 nanometers, no greater than 15 nanometers, no greater than 10 nanometers, or no greater than 5 nanometers. As used herein, the Scherrer grain size of a phase of an alloy material is determined, as is readily understood by those skilled in the art, by X-ray diffraction and the Scherrer equation.

In some embodiments, the electrochemically active material may further include one or more coatings disposed on and at least partially surrounding (and up to completely surrounding) the silicon containing material. As used herein, with respect to the silicon containing material, a "coating" refers to a single layer or multiple layers of a material or materials disposed on or over an external surface of the material (e.g, oxide or alloy particles). The term "coating" may refer to both a layer exclusively disposed on the external surface of the material as well as a layer which to some degree penetrates the external surface of the material. A "coating" may be in direct contact with the material (i.e., there may exist no intermediate layer between the material and the coating) or may be disposed over one or more intermediate layers or coatings disposed on the material.

In some embodiments, the electrochemically active material may include a coating that includes an electrically conductive layer or coating. For example, in some embodiments, the electrically conductive coating may include a carbonaceous material, such as carbon black. The electrically conductive coating may be present in an amount of between 0.01 and 20 wt. %, 0.1 and 10 wt. %, or 0.5 and 5 wt. %, based on the total weight of the silicon containing material and the electrically conductive coating.

In some embodiments, in addition to, or as an alternative to the electrically conductive coating, the electrochemically active material may include a cross-linked polymer containing coating. For example, the cross-linked polymer containing coating may be disposed over an intermediate layer (e.g., the electrically conductive coating). As used herein, a "cross-linked polymer" may refer to a polymer network having covalent bonds between linear or branched polymer chains, resulting in a solvent stable polymer network. These covalent bonds may be generated by methods using, for example, chemical-crosslinkers, heat, ultraviolet rays, electron beam, radiation ray, or a combination of thereof. In some embodiments the cross-linked polymer containing coating may consist of or consist essentially of one or more cross-linked polymers.

In some embodiments, the cross-linked polymers may include one or more cross-linked (co)polymers derived from polymerization of one or more vinylic monomers. For purposes of the present disclosure, the term "vinylic monomers" refers to monomers possessing a substituted or unsubstituted vinyl group in their molecular structure that can undergo addition or chain-growth polymerization processes. Such polymerization reactions can be cationically, anionically, or radically initiated utilizing initiators well known in the art.

In some embodiments, the vinylic monomers may include one or more cross-linkable vinylic monomers. Generally, cross-linkable vinylic monomers may refer to vinylic monomers that include reactive functional groups such as, for example, vinyl groups, propargyl groups, azide groups, carboxylic acid groups, phosphonic acid groups, hydroxyl groups, N-methylolamido groups or alkoxysilyl groups. As used herein, the term "cross-linkable", when used in describing a monomer, refers to a monomer that can participate in a secondary cross-linking reaction independent of the primary chain growth polymerization. The corresponding reactive functional groups are stable during the polymerization process, or in the absence of chemical crosslinkers or radiation energy. It is to be appreciated that the reactive functional groups can be protected prior to the crosslinking reaction. The protection/de-protection reactions may include, for example, reversible neutralization of acid functionalities with ammonium hydroxide, formation and hydrolysis of anhydrides, reversible diels-alder reactions, and the like.

In some embodiments, the cross-linkable vinylic monomers may include one or more carboxyl or carboxylate groups. In some embodiments, the cross-linkable vinylic monomers may include vinylic carboxylic acids such as acrylic acid and methacrylic acid. Examples of other vinylic carboxylic acids may include dicarboxylic acids or derivatives such as maleic acid or its anhydrides, fumaric acid and itaconic acid. In various embodiments, the half esters of these dicarboxylic acids may be employed.

In some embodiments, additional or alternative cross-linkable vinylic monomers may include allyl (meth)acrylate, 2-hydroxy ethyl (meth)acrylate, 3-trimethoxysilylpropyl (meth)acrylate, and 3-triethoxysilylpropyl (meth)acrylate.

In some embodiments, in addition to the above-described cross-linkable vinylic monomers, the vinylic monomers may include monofunctional vinylic monomers such as alkali metal (e.g., lithium) salts of (meth)acrylic acid, alkyl esters or amides of (meth)acrylic acid containing 1 to 18 carbon atoms in the alkyl group (e.g., methyl (meth)acrylate or 2-ethylhexyl (meth)acrylate or stearyl (meth)acrylate or dimethylacrylamide), or substituted alkyl esters or amides of (meth)acrylic acid, (e.g. hydroxyethyl acrylate or tetrahydrofurfuryl acrylate or glycidyl methacrylate or methoxypoly(ethylene glycol) (meth)acrylate). As used herein, the term "monofunctional" when used to describe a vinylic monomer, refers to monomers that bear only one chemically reactive functional group, and this reactive functional group is a vinyl group that is suitable for polymerization reaction. Additional monofunctional vinylic monomers may also include styrenic compounds such as styrene, alpha-methyl styrene; N-vinylimidazole; 4-vinylpyridine; organic nitriles such as acrylonitrile; N-vinylcaprolactam, or N-vinylpyrrolidone; vinylphosphonic acid; or fluorine-containing vinylic monomers, cross-linked (co)polymer.

In some embodiments, the cross-linked (co)polymers of the present disclosure may include monofunctional vinylic monomer derived units in an amount of at least 50 wt. %, at least 60 wt. %, at least 70 wt. %, or at least 75 wt. %, based on the total weight of the cross-linked (co)polymer. In some embodiments, no greater than 30 wt. %, no greater than 20 wt. %, or no greater than 10 wt. % of the non-crosslinkable monofunctional monomer may include non-ionic vinylic monomers, based on the total weight of vinylic monomers. In some embodiments, the cross-linked (co)polymers of the present disclosure may be derive8d from at least two monofunctional vinylic monomers.

In some embodiments, in addition or as an alternative to the above-described vinylic monomers, the cross-linked (co)polymers may be derived from polymerization of one or more silane-functional monomers represented by Chemical Structure (I), $$CH_2{=}CH{-}R^1{-}Si(X)_xR^2_{3-x} \quad (I)$$

where $R^1$ is a covalent bond or a divalent linking group selected from alkylene, arylene, alkarylene, and aralkylene optionally substituted with one or more heteroatoms or heteroatom-containing moieties; X is a hydrolysable group selected from $C_1$-$C_4$ alkoxy; x is 0, 1, 2, or 3; and $R^2$ is a $C_1$-$C_4$ alkyl group. It has been discovered that —SiO— (and thus silanol or —SiOH) functionality may be present on the surface of certain silicon containing particles of the present disclosure. In this regard, materials that can improve their adhesion to such alloy by reaction of —SiOH surface groups with silane functionality may be desirable. For example, such improved adhesion may contribute to the negative electrode's ability to adhere to the current collector and withstand the volume changes occurring upon lithiation-delithiation cycling. The silanol functionality can also undergo condensation self-reactions within the coating to form water and —Si—O—Si— linkages leading to cross-linking and subsequent water insolubility. Additionally, it was discovered that the level of silane-functional co-monomer incorporation into the silane-functional (co)polymer may be significant. For example, if the silane content is too high the material may be unstable to premature crosslinking and form gels, rendering it incapable of aqueous and solution-based processing. Molecular weight control may also be significant through the use of chain transfer agents added to the polymerization mixture. In this regard, in some embodiments, silane-functional monomer units may be present in the cross-linkable (co)polymer in an amount of less than 5, 4, or 3 wt. %; or between 1 and 5 wt. %, based on the total weight of the cross-linkable (co)polymer.

In some embodiments, the cross-linked (co)polymers may be prepared from a mixture of 95 wt. % acrylic acid and 5 wt. % 3-trimethoxysilylpropyl methacrylate and chain transfer agents such as mercaptopropyltrimethoxysilane, carbon tetrabromide, and mercaptoethanol to provide water solubility in both the unneutralized polycarboxylic acid form as well as the polylithium salt produced by neutralization of the (co)polymer with lithium hydroxide. In aqueous solution, the methoxysilane groups may be hydrolyzed to silanetriol functionality, and the (co)polymer is stable in solution until coated and dried to remove the water. At this point the silanetriol groups may condense, giving a crosslinked solid which may swell when put back in water, but does not dissolve within at least 24 hours at room temperature. In contrast, a polyacrylic acid or lithium polyacrylate control with no silane functionality redissolves within minutes when re-exposed to water.

In some embodiments, cross-linkable vinylic monomer derived units may be present in the cross-linked (co)polymer in an amount of 0.1 to 100 wt. %, 0.5 to 60 wt. %, 1 to 50 wt. %, 2 to 40 wt. % or 3 to 30 wt. %, based on the total weight of cross-linked (co)polymer.

In addition to embodiments in which the cross-linked polymer containing coating materials includes cross-linked (co)polymers derived from polymerization of one or more cross-linkable vinylic monomers units, the cross-linked (co) polymers may include cross-linking bonds generated by addition of one or more chemical cross-linking reagents to a polymer not otherwise containing cross-linking functionality. Suitable chemical cross-linking reagents may include one or more (including any combination of two or more) oligomeric or polymeric multifunctional, alcohol, aziridines, bisamides, glycidylethers, oxazolines, triazines, silanes, carbodiimides, or isocyanates. In some embodiments, the cross-linking reaction may take place between a carboxylic acid group and an aziridine group, between a carboxylic acid group and a bisamide group, or between a hydroxyl group and an isocyanate group at elevated temperatures.

In various embodiments, the cross-linked polymer containing coating may be present in an amount of between 0.01 and 10 wt. %, 0.1 and 10 wt. %, 0.5 and 10 wt. %, or 1 and 10 wt. %, 0.5 and 5 wt. %, or 1 and 5 wt. %, based on the total weight of the silicon containing material and the crosslinked polymer containing coating.

In some embodiments, electrochemically active material of the present disclosure (including any conductive or cross-linked polymer containing materials) may be present in a dry form (e.g., as a dry powder). In this regard, the coated materials may be present in a composition that includes less than 20 wt. %, less than 2 wt. %, or less than 0.2 wt. % of liquid (e.g., aqueous or organic liquid solvent or liquid dispersant), based on the total weight of the composition.

Generally, the cross-linked polymer containing coatings of the present disclosure may function to protect the surface of the active material while allowing $Li^+$ and electrons to reach the active material. They may further reduce the electrochemically-active specific surface area. They may further act in similar to a passivation layer, such as a solid-electrolyte-interface (SEI), in acting to diminish or even to halt deleterious side-reactions of the electrolyte near the surfaces. It is believed that the cross-linking strengthens the polymer coating and increases its adhesion to the active material, increasing its ability to remain in contact with the active material, and also increasing its ability to hold together agglomerates comprising more than one active material particle. It is believed that this added strength may be important because polymer-coated active material particles or agglomerates are subjected to severe stress and fatigue during high-shear mixing of the slurry formed in preparation for coating the anode material onto a current collector, during the compression of the dried anode on the current collector, and during the cycling of the battery. It is believed that the cross-linking may also reduce the hydrophilicity of the resulting material, thus making it easier to build batteries with very low water content, which may be important to achieving high cycle-life. Prior attempts at using polymer materials to improve the cycle-life of batteries having high-energy-density anode materials based on silicon involved polymers that are soluble in water, and thus may completely disassociate from the active materials in a water-based slurry. The cross-linked polymer containing coatings of the present disclosure overcome this challenge. Additional prior attempts, while demonstrating benefits at the surface of the silicon-based material, have at the same time proven detrimental to other active materials in the negative electrode or the current collector surface. By applying the polymer material as a coating to the surface of the silicon-based material, and keeping the coating material localized there by virtue of cross-linking, these additional challenges are also overcome.

In some embodiments, as will be discussed in further detail below, as a result of deposition of the cross-linked polymer containing coating onto the silicon containing material, aqueous solvent stable agglomeration of the electrochemically active material (e.g., the silicon containing material and any conductive or cross-linked polymer containing coatings) may occur. In this regard, in some embodiments, the electrochemically active material may be in the form of a dry composition of agglomerate particles having an average particle size of between 0.5 and 20, 0.5 and 10, or 1 and 10 microns.

In some embodiments, the dry composition of agglomerate particles may have a particle size distribution. Generally, the particle size distribution for anode active material may have a significant impact on the performance of the negative electrode materials (e.g., cycle-life, calendar-life, and swelling). If the distribution includes too many particles that are too small, the specific surface area will be too high. This will tend to increase the reaction rate of deleterious side-reactions of the electrolyte at the surfaces, which will more rapidly increase resistance in the cell, drive the cathode potential higher, and consume solvent and or salt molecules, ultimately leading to poor cycle-life, poor calendar-life, and high swelling. If the distribution includes too many particles that are too large, the power-capability will diminish, the electrode will tend to buckle, and the risk of shorting across the separator will increase. Thus, a cross-linked polymer coated active material should have a particle size distribution determined based on reactivity of an electrolyte of interest on the polymer coated surface. If that reactivity is near zero, then the ideal size distribution will be smaller. If that reactivity is more moderately reduced, than the ideal size distribution will be closer to that of conventional anode active materials. A conventional anode active material may have a distribution where 10% of the particles are less than 1-5 microns, 50% are less than 8-20 microns, and 90% are less than 15-30 microns.

In some embodiments, the negative electrode compositions of the present disclosure, in addition to the above described electrochemically active material, may further include additional electrochemically active materials (e.g., graphite), binders, conductive diluents, fillers, adhesion promoters, thickening agents for dispersion viscosity modification, or other additives known by those skilled in the art. In some embodiments, the above-described electrochemically active material (e.g., the alloy material and any non-metallic, water insoluble, or electrolyte resistant coatings) may be present in the negative electrode composition in an amount of between 10 and 99 wt. %, 20 and 98 wt. %, 40 and 98 wt. %, 60 and 98 wt. %, 75 and 95 wt. %, or 85 and 95 wt. %, based on the total weight of the negative electrode composition.

In some embodiments, the negative electrode compositions may further include graphite, for example, to improve the density and cycling performance, especially in calendered coatings, as described in U.S. Patent Application Publication 2008/0206641 by Christensen et al., which is herein incorporated by reference in its entirety. The graphite may be present in the negative electrode composition in an amount of greater than 10 wt. %, greater than 20 wt. %, greater than 50 wt. %, greater than 70 wt. % or even greater, based upon the total weight of the negative electrode composition; or between 20 wt. % and 90 wt. %, between 30 wt. % and 80 wt. %, between 40 wt. % and 60 wt. %, between 45 wt. % and 55 wt. %, between 80 wt. % and 90 wt. %, or between 85 wt. % and 90 wt. %, based upon the total weight of the electrode composition.

In some embodiments, the negative electrode compositions may also include a binder. Suitable binders may include styrene-butadiene-rubber/sodium carboxymethylcellulose, acrylic acid (co)polymers and their alkali metal salts, fluoropolymer/acrylic (co)polymer blends. In some embodiments, the binder may be present in the electrode composition in an amount of between 0.1 and 2, 1 and 10, or 3 and 10, based upon the total weight of the negative electrode composition. In some embodiments, the cross-linked polymers present in the cross-linked polymer containing coatings are not present in the binder. In various embodiments, the cross-linked polymers present in the cross-linked polymer containing coatings are present in the binder in an amount of less than 50 wt. %, less than less than 40 wt. % less than 30 wt. % less than 20 wt. % less than 10 wt. %, less than 5 wt. %, less than 1 wt. %, or less than 0.1 wt. %, based on the total weight of the binder. As used herein, in the context of an electrode composition, the term "binder" refers a material that functions to produce or promote cohesion in the loosely assembled substances that form the electrode or adhesion of those substances to the metal current collector (e.g. copper foil).

In illustrative embodiments, the negative electrode compositions may also include an electrically conductive diluent to facilitate electron transfer from the composition to a current collector. Electrically conductive diluents include, for example, carbons, conductive polymers, powdered metal, metal nitrides, metal carbides, metal silicides, and metal borides, or combinations thereof. Representative electrically conductive carbon diluents include carbon blacks such as Super P and Super S carbon blacks (both from Timcal, Switzerland), Shawinigan Black (Chevron Chemical Co., Houston, Tex.), acetylene black, furnace black, lamp black, graphite, carbon fibers, and combinations thereof. In some embodiments, the conductive carbon diluents may include carbon nanotubes. In some embodiments, the amount of conductive diluent (e.g., carbon nanotubes) in the electrode composition may be at least 2 wt. %, at least 6 wt. %, or at least 8 wt. %, or at least 20 wt. % based upon the total weight of the electrode coating; or between 0.2 wt. % and 80 wt. %, between 0.5 wt. % and 50 wt. %, between 0.5 wt. % and 20 wt. %, or between 1 wt. % and 10 wt. %, based upon the total weight of the negative electrode composition.

In some embodiments, prior to deposition of the negative electrode compositions of the present disclosure onto a current collector (to form the negative electrode), the negative electrode compositions may be present in aqueous dispersion. In this regard, the present disclosure is further directed to aqueous dispersions that include the negative electrode compositions. In some embodiments, the aqueous dispersions may include the above-described electrochemically active material (e.g., the agglomerate particles that include the silicon containing material and any conductive or cross-linked polymer containing coatings) in an amount of between 1 and 90 weight % or 5 and 30 weight %, based on the total weight of the aqueous dispersion; graphite in an amount of between 10 and 90 weight % or 20 and 70 weight %, based on the total weight of the aqueous dispersion; binder (e.g., styrene-butadiene-rubber/sodium carboxymethyl-cellulose) in an amount of between 0.2 and 10 or 0.5 and 5 weight %, based on the total weight of the aqueous dispersion; and acrylic acid (co)polymers and their alkali metal salts in an amount of between 0.01 and 10 or 0.5 and 20, based on the total weight of the aqueous dispersion. In some embodiments, the components of the aqueous dispersion may be uniformly distributed within the dispersant (e.g., water).

In some embodiments, as discussed above, a negative electrode composition that includes the electrochemically active material of the present disclosure is formed in which electrochemically active materials are blended with other materials to form a slurry that is deposited onto a current collector (e.g. copper foil), and the slurry is dried and compressed. Such a negative electrode may, for example, contain other active materials, such as graphite, conductive additives, such as carbon black, graphene, or carbon nanotubes or fibers, all which are held together and adhered to the current collector by one or more binder materials, such as PVDF, carboxyl-methyl cellulose, styrene butadiene rubber, or combinations thereof. In such embodiments, it is an advantage of the present disclosure that the cross-linked polymer containing coatings of the present disclosure are present as discrete particle coatings (i.e., located primarily at the surfaces of the silicon containing material) as opposed to located on and between all of the components of the electrode as would be in the case of use as a binder, in part, because the benefit of the coatings of the present disclosure is in modifying and protecting the surfaces of the silicon containing material. Although the cross-linked polymer containing coatings of the present disclosure could in theory also be used as a binder material to hold together all of the electrode components and to adhere them to the current collector, they are not as well suited to that purpose as other binders that have been used commercially in the industry. Moreover, some disadvantages of using such cross-linked polymer containing coatings as a binder material for all components of an electrode are that they may not adhere as well, they tend to be more brittle, and they tend to be more hydrophilic. By using such cross-linked polymers as a discrete coating of the silicon containing materials, and not as a binder for all the components of the electrode, the total content of this electrochemically-inactive and potentially hydrophilic material may be minimized.

In some embodiments, the present disclosure is further directed to negative electrodes for use in lithium ion electrochemical cells. The negative electrodes may include a current collector having disposed thereon the above-described negative electrode composition. The current collector may be formed of a conductive material such as a metal (e.g., copper, aluminum, nickel), or a carbon composite.

In some embodiments, the present disclosure further relates to lithium-ion electrochemical cells. In addition to the above-described negative electrodes, the electrochemical cells may include a positive electrode, an electrolyte, and a separator. In the cell, the electrolyte may be in contact with both the positive electrode and the negative electrode, and the positive electrode and the negative electrode are not in physical contact with each other; typically, they are separated by a polymeric separator film sandwiched between the electrodes.

In some embodiments, the positive electrode may include a positive electrode composition disposed on a current collector. The positive electrode composition may include an active material that includes a lithium metal oxide. In an exemplary embodiment, the active material may include lithium transition metal oxide intercalation compounds such as $LiCoO_2$, $LiCo_{0.2}Ni_{0.8}O_2$, $LiMn_2O_4$, $LiFePO_4$, $LiNiO_2$, or lithium mixed metal oxides of manganese, nickel, and cobalt in any effective proportion, or of nickel, cobalt, and aluminum in any effective proportion. Blends of these materials can also be used in positive electrode compositions. Other exemplary cathode materials are disclosed in U.S. Pat. No. 6,680,145 (Obrovac et al.) and include transition metal grains in combination with lithium-containing grains. Suitable transition metal grains include, for example, iron, cobalt, chromium, nickel, vanadium, manganese, copper, zinc, zirconium, molybdenum, niobium, or combinations thereof with a grain size no greater than about 50 nanometers. Suitable lithium-containing grains can be selected from lithium oxides, lithium sulfides, lithium halides (e.g., chlorides, bromides, iodides, or fluorides), or combinations thereof. The positive electrode composition may further include additives such as binders (such as polymeric binders (e.g., polyvinylidene fluoride), conductive diluents (e.g., carbon, carbon black, flake graphite, carbon nanotubes, conductive polymers), fillers, adhesion promoters, thickening agents for coating viscosity modification such as carboxymethylcellulose, or other additives known by those skilled in the art.

In various embodiments, useful electrolyte compositions for the electrochemical cells may be in the form of a liquid, solid, or gel. The electrolyte compositions may include a salt and a solvent (or charge-carrying medium). Examples of liquid electrolyte solvents include ethylene carbonate, dimethyl carbonate, ethyl methyl carbonate, diethyl carbonate, propylene carbonate, fluoroethylene carbonate, tetrahydrofuran (THF), acetonitrile, and combinations thereof. In some embodiments the electrolyte solvent may comprise glymes, including monoglyme, diglyme and higher glymes, such as tetraglyme. Examples of suitable lithium electrolyte salts include $LiPF_6$, $LiBF_4$, $LiClO_4$, lithium bis(oxalato)borate, $LiN(CF_3SO_2)_2$, $LiN(C_2F_5SO_2)_2$, $LiAsFe_6$, $LiC(CF_3SO_2)_3$, and combinations thereof.

In some embodiments, the lithium-ion electrochemical cells may further include a microporous separator, such as a microporous material available from Celgard LLC, Charlotte, N.C. The separator may be incorporated into the cell and used to prevent the contact of the negative electrode directly with the positive electrode.

The disclosed lithium ion electrochemical cells can be used in a variety of devices including, without limitation, portable computers, tablet displays, personal digital assistants, mobile telephones, motorized devices (e.g., personal or household appliances, power tools and vehicles), instruments, illumination devices (e.g., flashlights) and heating devices. Multiple lithium ion electrochemical cells of this disclosure can be combined to provide a battery pack.

The present disclosure further relates to methods of making the above-described electrochemically active materials. In embodiments in which the silicon containing material include a silicon containing alloy, the alloy material can be made by methods known to produce films, ribbons, or particles of metals or alloys including cold rolling, arc melting, resistance heating, ball milling, sputtering, chemical vapor deposition, thermal evaporation, atomization, induction heating or melt spinning. In some embodiments, the alloy material can be made in accordance with the methods of U.S. Pat. Nos. 7,871,727, 7,906,238, 8,071,238, or U.S. Pat. No. 8,753,545, which are each herein incorporated by reference in their entirety. In embodiments in which the silicon containing material includes silicon oxide, the material may be made in accordance with Japanese Patent 2001-185127, which is herein incorporated by reference in its entirety The coatings may be applied to the silicon containing material by milling, solution deposition, vapor phase processes, or other processes known to those of ordinary skill in the art. In some embodiments, solution deposition may be employed.

In embodiments in which the electrochemically active material includes an electrically conductive layer, such coating may be applied in accordance with the methods of U.S. Pat. No. 6,664,004, which is herein incorporated by reference in its entirety.

The present disclosure further relates to methods of making negative electrodes that include the above-described negative electrode compositions. In some embodiments, the method may include mixing the above-described electrochemically active materials, along with any additives such as graphite, binders, conductive diluents, fillers, adhesion promoters, thickening agents, in a suitable coating solvent such as water or N-methylpyrrolidinone to form a coating dispersion or coating mixture. In some embodiments, the binders added to the mixture may include either or both of styrene butadiene rubber and carboxymethyl-cellulose. In some embodiments, as a result of the cross-linked polymer containing coatings of the present disclosure, the electrochemically active materials may exhibit stable particle sizes. Specifically, the crosslinked polymer coated electrochemically active materials may retain its particle size and size distribution in both aqueous and organic solvents (e.g. water, NMP and etc.). This may be particularly advantageous given that the electrochemically active materials will typically be dispersed into aqueous or organic media with other active materials, conductive agents, and binders under high shear to form a slurry, which is then coated on the current collector.

In some embodiments, the dispersion may be mixed thoroughly and then applied to a foil current collector by any appropriate coating technique such as knife coating, notched bar coating, dip coating, spray coating, electrospray coating, or gravure coating. The current collectors may be thin foils of conductive metals such as, for example, copper, aluminum, stainless steel, or nickel foil. The coating mixture may be coated onto the current collector foil and then allowed to dry in air or vacuum, and optionally by drying in a heated oven, typically at about 80° to about 300° C. for about an hour to remove the solvent.

The present disclosure further relates to methods of making lithium ion electrochemical cells. In various embodiments, the method may include providing a negative electrode as described above, providing a positive electrode that includes lithium, and incorporating the negative electrode and the positive electrode into an electrochemical cell comprising a lithium-containing electrolyte.

Listing of Embodiments

1. A negative electrode composition comprising:
   a silicon containing material; and
   a crosslinked polymer containing coating surrounding at least a portion of the silicon containing material;
   wherein the crosslinked polymer containing coating comprises a (co)polymer derived from polymerization of one or more vinylic monomers comprising a carboxyl or carboxylate group.

2. The negative electrode composition of embodiment 1, wherein the vinylic monomers comprise a cross-linkable vinylic monomer.

3. The negative electrode composition according to any one of the previous embodiments, wherein the vinylic monomers comprise acrylic acid, lithium acrylate, acrylonitrile, alkyl acrylate, or vinylphosphonic acid.

3. The negative electrode composition according to any one of the previous embodiments, wherein cross-linkable vinylic monomer derived units are present in the (co) polymer in an amount of greater than 5 weight percent, based on the total weight of the (co)polymer.

4. The negative electrode composition according to any one of the previous embodiments, wherein the vinylic monomers comprise one or more monofunctional vinylic monomer.

5. The negative electrode composition according to any one of the previous embodiments, wherein monofunctional vinylic monomer derived units are present in the (co) polymer in an amount of greater than 75 weight percent, based on the total weight of the (co)polymer.

6. The negative electrode composition according to any one of the previous embodiments, wherein the vinylic monomers comprise one or more non-ionic monofunctional vinylic monomers.

7. The negative electrode composition according to embodiment 6, wherein non-ionic monofunctional vinylic monomer derived units are present in the (co)polymer in an amount of less than 30 weight percent, based on the total weight of the (co)polymer.

8. The negative electrode composition according to any one of the previous embodiments, wherein the cross-linked (co)polymers are derived from polymerization of one or more silane-functional monomers represented by Chemical Structure (I), $$CH_2{=}CH{-}R^1{-}Si(X)_xR^2_{3-x} \qquad (I)$$

where $R^1$ is a covalent bond or a divalent linking group selected from alkylene, arylene, alkarylene, and aralkylene optionally substituted with one or more heteroatoms or heteroatom-containing moieties; X is a hydrolysable group selected from $C_1$-$C_4$ alkoxy; x is 0, 1, 2, or 3; and $R^2$ is a $C_1$-$C_4$ alkyl group.

9. The negative electrode composition according to any one of the previous embodiments, wherein the cross-linked polymer containing coating is present in an amount of between 0.1 and 10 wt. %, based on the total weight of the silicon containing material and the cross-linked polymer containing coating in the negative electrode composition.

10. The negative electrode composition according to any one of the previous embodiments, wherein the negative electrode composition is present as a dry composition comprising less than 5 weight % of liquid, based on the total weight of the negative electrode composition.

11. The negative electrode composition of any one of the previous embodiments, further comprising a second coating surrounding at least a portion of the silicon containing material, wherein the second coating comprises a conductive material.

12. The negative electrode composition according to embodiment 6, wherein the second coating comprises carbon black.

13. The negative electrode composition of any one of the previous embodiments, wherein the negative electrode composition comprises particles comprising the silicon containing material and the crosslinked polymer containing coating, and wherein the particles have D10 greater than 0.7 μm and D90 less than 15 μm.

14. The negative electrode according to any one of the previous embodiments, wherein the negative electrode composition comprises agglomerate particles comprising the silicon containing material and the crosslinked polymer containing coating, and wherein the agglomerate particles have D10 greater than 2.5 μm and D90 less than 50 μm.

15. The negative electrode composition of any one of the previous embodiments, wherein the silicon containing material comprises particles having the formula: $Si_xM_yC_z$, where x, y, and z represent atomic % values and (a) $x+y+z=100\%$; (b) $x>2y+z$; (c) x and y are greater than 0; z is equal to or greater than 0; and (d) M is iron and optionally one or more metals selected from manganese, molybdenum, niobium, tungsten, tantalum, copper, titanium, vanadium, chromium, nickel, cobalt, zirconium, and yttrium.

16. The negative electrode composition of embodiment 13, wherein $65\%\leq x\leq 85\%$, $5\%\leq y\leq 20\%$, and $5\%\leq z\leq 15\%$.

17. The negative electrode composition of any one embodiments 13-14, wherein the particles have an average size of between 0.1 and 10 μm.

18. The negative electrode composition of any one of the previous embodiments, further comprising graphite in an amount of between 1 and 80 wt. %, based on the total weight of the negative electrode composition.

19. The negative electrode composition of any one of the previous embodiments, further comprising a binder, wherein the polymers of the crosslinked polymer containing coating are present in the binder in an amount of less than 50 wt. %, based on the total weight of the binder.

20. A negative electrode comprising:

the negative electrode composition according to any one of embodiments 1-17; and a current collector.

21. An electrochemical cell comprising:

the negative electrode of embodiment 18;

a positive electrode comprising a positive electrode composition comprising lithium; and an electrolyte comprising lithium.

22. An electronic device comprising the electrochemical cell according to embodiment 19.

23. An aqueous dispersion comprising:

a negative electrode composition according to any one of embodiments 1-18;

graphite;

a binder; and water.

24. A method of making an electrochemical cell, the method comprising:

providing a positive electrode comprising a positive electrode composition comprising lithium;

providing a negative electrode according to embodiment 18;

providing an electrolyte comprising lithium; and incorporating the positive electrode, negative electrode, and the electrolyte into an electrochemical cell.

The operation of the present disclosure will be further described with regard to the following detailed examples. These examples are offered to further illustrate various specific embodiments and techniques. It should be understood, however, that many variations and modifications may be made while remaining within the scope of the present disclosure.

EXAMPLES

The following examples are offered to aid in the understanding of the present disclosure and are not to be construed as limiting the scope thereof. Unless otherwise indicated, all parts and percentages are provided on a weight basis. All materials were obtained from Sigma-Aldrich Corporation, US and used as received, unless otherwise indicated.

Materials Used

| Material | Description | Source |
|---|---|---|
| PZ-502 | Poly Alkyloxy Amino Ester Derivative | preparation procedures follow |
| SR-502 | Trifunctional Acrylate Monomer | Sartomer, Exton, PA, US |
| PZ-28 | Polyfunctional Aziridine | Polyaziridine LLC, Medford, NJ, US |
| R-235 | Polyvinyl Alcohol (PVA) | Kuraray, Japan |
| BAYHYDUR 302 | Aliphatic Polyisocyanate | Covestro LLC, Baytown, TX, US |
| PERMUTEX XR-13-554 | Cross-linker | Stahl Europe By, Netherlands |
| EPOCROS WS-500 | Polymer Crosslinker | Nippon Shokubai Co., Ltd, Japan |
| EPOCROS K-2030E | Polymer Crosslinker | Nippon Shokubai Co., Ltd, Japan |
| Lithium Hydroxide Monohydrate | Lithium Base | Alfa Aesar, Haverhill, MA, US |
| Potassium Persulfate | Initiator | Alfa Aesar, Haverhill, MA, US |
| VAZO-52 | Initiator | Chemours, Wilmington, DE, US |
| VAZO-67 | Initiator | Chemours, Wilmington, DE, US |
| V-50 | Vazo Initiator | Chemours, Wilmington, DE, US |
| Dimethylformamide | Solvent | EMD Millipore, Burlington, MA, US |
| Ammonium Hydroxide Solution | Base | EMD Chemicals, Gibbstown, NJ, US |
| SUPER P | Carbon Black | Timcal Ltd., Bodio, Switzerland |
| KS6 | Graphite | Timcal Ltd., Bodio, Switzerland |

Preparation of Crosslinkers

Synthesis of Multi-Functional PEG-Aziridine Crosslinker PZ-502—

Trifunctional aziridine crosslinker, PZ-502, was prepared via a Michael addition of SR-502 with 2-methylaziridine. 2-methylaziridine (9.1 grams, 0.1385 mol) was added dropwise to the SR-502 (30 grams, 0.0434 mol) at room temperature, then the resulting mixture was stirred for 1 hour at room temperature and refluxed at 60° C. for 24 hours. Excessive methyl aziridine was removed under vacuum and finally a slight yellow liquid product was obtained and named PZ-502. The disappearance of the double bonds from 5.8 to 6.4 confirms that the reaction between acrylate group and NH in the methyl aziridine was completed successfully.

Preparation of Poly(Vinyl Alcohol) Crosslinker—

PVA solutions were prepared by dissolving the R-235 pellets in hot water to desired % solids (e.g., 6.75 wt %).

Preparation of Acrylic Copolymers

Preparatory Example 1—Synthesis of Polyacrylic Acid (PAA) Solution

A 32 oz. (1 L) screw-top reaction bottle was charged with 50 parts of Acrylic Acid (AA), 250 parts of deionized (DI) water, and 0.125 parts of potassium persulfate initiator. The solution was purged with nitrogen for 2 minutes and sealed.

The bottle was placed in a rotary water bath at 60° C. for 21 hours. The reaction bottle was taken out and cooled to room temperature. A clear viscous polymer solution was obtained. Gravimetric analysis revealed complete monomer conversion.

Preparatory Example 3—Synthesis of Poly(Acrylic Acid-Co-Acrylonitrile 90/10) (Poly(AA/AN 90/10)) Solutions A 8 oz. (250 mL) screw-top reaction bottle was charged with 4.5 parts of AA, 0.5 parts of acrylonitrile (AN), 40.5 parts of DI water, 4.5 parts dimethylformamide, 0.5 parts isopropanol as the chain transfer agent, and 0.025 parts of potassium persulfate initiator. The solution was purged with nitrogen for 2 minutes and sealed. The bottle was placed in a rotary water bath at 60° C. for 21 hours. The reaction bottle was taken out and cooled to room temperature. A clear viscous polymer solution was obtained.

Preparatory Example 4—Synthesis of Poly(Acrylic Acid-Co-Acrylonitrile 80/20) (Poly(AA/AN 80/20)) Solutions A 8 oz. (250 mL) screw-top reaction bottle was charged with 4.0 parts of AA, 1.0 parts of acrylonitrile (AN), 36 parts of DI water, 9 parts dimethylformamide, 0.5 parts isopropanol as the chain transfer agent, and 0.025 parts of potassium persulfate initiator. The solution was purged with nitrogen for 2 minutes and sealed. The bottle was placed in a rotary water bath at 60° C. for 21 hours. The reaction bottle was taken out and cooled to room temperature. A clear viscous polymer solution was obtained.

Preparatory Example 5—Synthesis of Poly(Acrylic Acid-Co-Acrylonitrile 70/30) (Poly(AA/AN 70/30)) Solutions A 8 oz. (250 mL) screw-top reaction bottle was charged with 3.5 parts of AA, 1.5 parts of acrylonitrile (AN), 31.5 parts of DI water, 13.5 parts dimethylformamide, 0.5 parts isopropanol as the chain transfer agent, and 0.025 parts of potassium persulfate initiator. The solution was purged with nitrogen for 2 minutes and sealed. The bottle was placed in a rotary water bath at 60° C. for 21 hours. The reaction bottle was taken out and cooled to room temperature. A clear viscous polymer solution was obtained.

Preparatory Example 6—Synthesis of Poly(Acrylic Acid-Co-Acrylonitrile 60/40) (Poly(AA/AN 60/40)) Solutions A 8 oz. (250 mL) screw-top reaction bottle was charged with 3.0 parts of AA, 2.0 parts of acrylonitrile (AN), 27 parts of DI water, 18 parts dimethylformamide, 0.5 parts isopropanol as the chain transfer agent, and 0.025 parts of potassium persulfate initiator. The solution was purged with nitrogen for 2 minutes and sealed. The bottle was placed in a rotary water bath at 60° C. for 21 hours. The reaction bottle was taken out and cooled to room temperature. A clear viscous polymer solution was obtained.

Preparatory Example 7—Synthesis of Poly(Acrylic Acid-Co-Acrylonitrile 50/50) (Poly(AA/AN 50/50)) Solutions A 8 oz. (250 mL) screw-top reaction bottle was charged with 2.5 parts of AA, 2.5 parts of acrylonitrile (AN), 22.5 parts of DI water, 22.5 parts dimethylformamide, 0.5 parts isopropanol as the chain transfer agent, and 0.025 parts of potassium persulfate initiator. The solution was purged with nitrogen for 2 minutes and sealed. The bottle was placed in a rotary water bath at 60° C. for 21 hours. The reaction bottle was taken out and cooled to room temperature. A clear viscous polymer solution was obtained.

Preparatory Example 8—Synthesis of Poly(Acrylic Acid-Co-Methyl Acrylate 90/10) (Poly(AA/MA 90/10)) Solutions A 8 oz. (250 mL) screw-top reaction bottle was charged with 5.4 parts of AA, 0.6 parts of methyl acrylate (MA), 18 parts of tetrahydrofuran solvent, and 0.015 parts Vazo52 initiator. The monomer solution was purged with nitrogen for 2 minutes and sealed. The bottle was placed in a rotary water bath at 52° C. for 60 hours. The reaction bottle was taken out and cooled to room temperature. A clear viscous polymer solution was obtained. The crude polymer product was precipitated into 150 parts ethyl acetate, filtered and dried under vacuum at 65° C. for 18 h. 2.5 parts of the vacuum dried poly (A A/MA 90/10) was re-dissolved in 7.5 parts DI water to make the poly(AA/MA 90/10) aqueous solution.

Preparatory Example 9—Synthesis of Poly(Acrylic Acid-Co—N-Vinylcaprolactam 90/10) (Poly(AA/NVC 90/10)) Solutions A 8 oz (250 mL) screw-top reaction bottle was charged with 5.4 parts of AA, 0.6 parts of N-vinylcaprolactam (NVC), 18 parts of tetrahydrofuran solvent, and 0.015 parts Vazo52 initiator. The monomer solution was purged with nitrogen for 2 minutes and sealed. The bottle was placed in a rotary water bath at 52° C. for 60 hours. The reaction bottle was taken out and cooled to room temperature. A clear viscous polymer solution was obtained. The crude polymer product was precipitated into 150 parts ethyl acetate, filtered and dried under vacuum at 65° C. for 18 h. 2.5 parts of the vacuum dried poly(AA/NVC 90/10) was re-dissolved in 7.5 parts DI water to make the poly(AA/NVC 90/10) aqueous solution.

Preparatory Example 10—Synthesis of Poly(Acrylic Acid-co-2-Hydroxyethyl Acrylate 90/10) (Poly(AA/HEA 90/10)) Solutions A 8 oz. (250 mL) screw-top reaction bottle was charged with 5.4 parts of AA, 0.6 parts of 2-hydroxyethyl acrylate (HEA), 18 parts of tetrahydrofuran solvent, and 0.015 parts Vazo52 initiator. The monomer solution was purged with nitrogen for 2 minutes and sealed. The bottle was placed in a rotary water bath at 52° C. for 60 hours. The reaction bottle was taken out and cooled to room temperature. A clear viscous polymer solution was obtained. The crude polymer product was precipitated into 150 parts ethyl acetate, filtered and dried under vacuum at 65° C. for 18 h. 2.5 parts of the vacuum dried poly(AA/HEA 90/10) was re-dissolved in 7.5 parts DI water to make the poly(AA/HEA 90/10) aqueous solution.

Preparatory Example 11—Synthesis of Poly(Acrylic Acid-Co-Tetrahydrofurfuryl Acrylate 90/10) (Poly(AA/THF-A 90/10)) Solutions A 8 oz. (250 mL) screw-top reaction bottle was charged with 5.4 parts of AA, 0.6 parts of tetrahydrofurfuryl acrylate (THF-A), 18 parts of tetrahydrofuran solvent, and 0.015 parts Vazo52 initiator. The monomer solution was purged with nitrogen for 2 minutes and sealed. The bottle was placed in a rotary water bath at 52° C. for 60 hours. The reaction bottle was taken out and cooled to room temperature. A clear viscous polymer solution was obtained. The crude polymer product was precipitated into 150 parts ethyl acetate, filtered and dried under vacuum at 65° C. for 18 h. 2.5 parts of the vacuum dried poly(AA/THF-A 90/10) was re-dissolved in 7.5 parts DI water to make the poly(AA/THF-A 90/10) aqueous solution.

Preparatory Example 12—Synthesis of Poly(Acrylic Acid-Co-Acrylamide 90/10) (Poly(AA/Am 90/10)) Solutions A 8 oz. (250 mL) screw-top reaction bottle was charged with 4.5 parts of AA, 0.5 parts of acrylamide (Am), 45 parts of DI water, and 0.015 parts potassium persulfate initiator. The monomer solution was purged with nitrogen for 2 minutes and sealed. The bottle was placed in a rotary water bath at 60° C. for 72 hours. The reaction bottle was taken out and cooled to room temperature. A clear viscous polymer solution was obtained.

Preparatory Example 13—Synthesis of Poly(Acrylic Acid-Co-Vinylphosphonic Acid 90/10) (Poly(AA/VPA 90/10)) Solutions A 8 oz. (250 mL) screw-top reaction bottle was charged with 4.5 parts of AA, 0.5 parts of vinylphosphonic acid (VP A), 45 parts of DI water, 2.5 parts isopropanol, and 0.015 parts potassium persulfate initiator. The monomer solution was purged with nitrogen for 5 minutes and sealed. The bottle was placed in a rotary water bath at 55° C. for 24 hours. The reaction bottle was taken out and cooled to room temperature. A clear viscous polymer solution was obtained.

Preparatory Example 14—Synthesis of Poly(Acrylonitrile-Co-2-Hydroxyethyl Acrylate 90/10) (Poly(AN HEA 90/10)) Solutions A 8 oz. (250 mL) screw-top reaction bottle was charged with 4.5 parts of Acrylonitrile, 0.5 parts of hydroxy ethyl acrylate (HEA), 22.5 parts of dimethylformamide, 2.5 parts ethyl acetate, 0.5 parts isopropanol and 0.025 parts Vazo67. The monomer solution was purged with nitrogen for 5 minutes and sealed. The bottle was placed in a rotary water bath at 65° C. for 24 hours. The reaction bottle was taken out and cooled to room temperature. A clear viscous polymer solution was obtained.

Preparatory Example 15—Synthesis of Poly(Acrylonitrile-Co-2-Hydroxyethyl Acrylate 80/20) (Poly(AN HEA 80/20)) Solutions A 8 oz. (250 mL) screw-top reaction bottle was charged with 4 parts of Acrylonitrile, 1 parts of hydroxy ethyl acrylate (HEA), 20 parts of dimethylformamide, 5 parts ethyl acetate, 0.5 parts isopropanol and 0.025 parts Vazo67. The monomer solution was purged with nitrogen for 5 minutes and sealed. The bottle was placed in a rotary water bath at 65° C. for 24 hours. The reaction bottle was taken out and cooled to room temperature. A clear viscous polymer solution was obtained.

Preparatory Example 16—Synthesis of Lithium Salts of Acrylic Acid/A-174 Copolymers Mixtures of acrylic acid (AA), A—174 (3-methacryloxy-propyl-trimethoxysilane), 3-mercaptopropyltrimethoxysilane (MPTMS), 2-mercaptoethanol (2-MCE), carbon tetrabromide, and V-50 initiator as shown in Table 1 were prepared in glass screwtop bottles. The indicated amounts of deionized water and isopropyl alcohol (IP A) were added to dissolve the solids. The bottles containing the initially clear, colorless solutions were sealed and placed in a rotating water bath at 50° C. for 21 hr. After the heat treatment, samples 16-1, 16-3, and 16-4 were seen to have gelled, and these mixtures were discarded. Weight percent solids on the remaining samples were determined by gravimetric analysis after heating at 120° C. for 30 min. Sample 16-2 was a clear, colorless, single phase solution, while samples 16-5 and 16-6 were slightly hazy.

Weighed portions of reaction mixtures 16-5 and 16-6 were placed in screwtop glass jars and neutralized to pH 7 (as measured using pH indicator strips) by portionwise addition of lithium hydroxide monohydrate. After neutralization was complete, solids content was measured by gravimetric analysis of a sample heated in a forced-air oven at 120° C. for 30-60 min, and adjusted to 10 wt % by further addition of deionized water. The resulting clear solutions were used in preparation of anode coatings as described below. Solid residues remaining upon drydown of small aliquots of these clear solutions were tested for solubility upon re-addition of deionized water. Residue from solution 16-5 was soluble, while that from solution 16-6 was not.

A weighed portion of reaction mixture 16-2 was placed in a screwtop glass jar and neutralized to pH 7 (as measured using pH indicator strips) by portionwise addition and dissolution of lithium hydroxide monohydrate. This gave phase separation into two liquid phases, a clear upper layer and a cloudy, viscous lower layer. The mixture was allowed to stand at room temperature for several days to allow phase separation to complete, the upper phase was decanted off, and the viscous lower layer was isolated. After gravimetric analysis, the material was adjusted to 10 wt % solids by further addition of deionized water. This gave a clear, colorless solution that was used in preparation of anode coatings as described below. The solid residue remaining upon drydown of a small aliquot of this solution was found to be insoluble upon re-addition of deionized water.

TABLE 1

Amounts of materials (in grams) used in the preparation of samples of Preparatory Example 16

| | 16-1 | 16-2 | 16-3 | 16-4 | 16-5 | 16-6 |
|---|---|---|---|---|---|---|
| AA | 98 | 98 | 95 | 95 | 100 | 98 |
| A-174 | 2 | 2 | 5 | 5 | 0 | 2 |
| MPTMS | 0 | 0 | 0 | 0 | 5 | 0 |
| $CBr_4$ | 1 | 1 | 1 | 1 | 0 | 0 |
| 2-MCE | 0 | 0 | 0 | 0 | 0 | 1 |
| V-50 | 1 | 1 | 1 | 1 | 1 | 1 |
| Deionized Water | 500 | 200 | 500 | 200 | 500 | 500 |
| IPA | 0 | 200 | 0 | 200 | 0 | 0 |
| Wt % Solids | ND | 23.9 | ND | ND | 17.7 | 16.6 |

Preparatory Example 17—Synthesis of Lithium Salts of Acrylic Acid/A-174 Copolymers Mixtures of acrylic acid (AA), A-174 (3-methacryloxy propyl-trimethoxysilane), 3-mercaptopropyltrimethoxysilane (MPTMS), 2-mercaptoethanol (2-MCE), and V-50 initiator as shown in Table 2 were prepared in glass screwtop bottles. The indicated amounts of deionized water and isopropyl alcohol (IPA) were added to dissolve the solids. The bottles containing the initially clear, colorless solutions were sealed and placed in a rotating water bath at 50° C. for 21 hr. After the heat treatment, sample 17-10 was seen to have gelled, and this mixture was discarded. Weight percent solids on the remaining samples, all clear, colorless solutions, were determined by gravimetric analysis after heating at 120° C. for 30 min.

Preparatory Example 18—Dissolution of Lithium Hydroxide Monohydrate in DI Water A 32 oz. (1 L) screw-top reaction bottle was charged with 30 parts of lithium hydroxide monohydrate and 170 parts of DI water. The bottle was placed on a roller at ambient condition for 48 hours. A clear 8.56 wt % lithium hydroxide aqueous solution was obtained.

TABLE 2

Amounts of materials (in grams) used in the preparation of samples of Preparatory Example 17.

| | 17-7 | 17-8 | 17-9 | 17-10 | 17-11 | 17-12 |
|---|---|---|---|---|---|---|
| AA | 98 | 96 | 98 | 95 | 95 | 95 |
| A-174 | 2 | 4 | 2 | 5 | 5 | 5 |
| MPTMS | 5 | 5 | 5 | 0 | 5 | 5 |
| 2-MCE | 0 | 0 | 0 | 1 | 1 | 1 |
| V-50 | 1 | 1 | 1 | 1 | 1 | 1 |
| Deionized Water | 200 | 200 | 500 | 500 | 500 | 200 |
| IPA | 200 | 200 | 0 | 0 | 0 | 200 |
| Wt % Solids | 22.8 | 22.9 | 17.8 | ND | 17.7 | 22.8 |

Preparation of Partially Neutralized Acrylic Acid-Containing Copolymers

Preparation of Polymer Solution 1A—

A 32 oz. (1 L) screw-top reaction bottle was charged with 100 parts of poly(acrylic acid) aqueous solution (16.7 wt %) from Preparatory Example 1, 55 parts of lithium hydroxide aqueous solution (8.56 wt %) from Preparatory Example 18 and 21.4 parts of DI water. The bottle was placed on a roller to equilibrate at ambient condition for 48 h. A clear 10.13 wt % partially neutralized poly(acrylic acid) lithium salt aqueous solution (pH 7) was obtained.

Preparation of Polymer Solution IB—

A 32 oz. (1 L) screw-top reaction bottle was charged with 100 parts of poly(acrylic acid) aqueous solution (16.7 wt %) from Preparatory Example 1, 45.4 parts of lithium hydroxide aqueous solution (8.56 wt %) from Preparatory Example 18 and 10.9 parts of DI water. The bottle was placed on a roller to equilibrate at ambient condition for 48 h. A clear 11.30 wt % partially neutralized poly(acrylic acid) lithium salt aqueous solution (pH 6) was obtained.

Preparation of Polymer Solution 1C—

A 32 oz. (1 L) screw-top reaction bottle was charged with 100 parts of poly(acrylic acid) aqueous solution (16.7 wt %) from Preparatory Example 1, 8 parts of lithium hydroxide monohydrate and 67 parts of DI water. The bottle was placed on a roller to equilibrate at ambient condition for 48 h. A clear 8.6 wt % partially neutralized poly(acrylic acid) lithium salt aqueous solution (pH 6.5) was obtained.

Preparation of Polymer Solutions 3-13—

Aqueous solutions of acrylic acid (co)polymers from Preparatory Examples 3-13 were partially neutralized with lithium hydroxide aqueous solution similar to the preparation of Polymer Solution IB, where 70 wt % of the acrylic acid contents in the copolymers were targeted for neutralization. The wt % of solids and solution pH for the resulting Polymer Solutions 3-13 are summarized in Table 3.

Preparation of Polymer Solution 14—

A 32 oz. (1 L) screw-top reaction bottle was charged with 100 parts of poly(acrylic acid) aqueous solution (16.7 wt %) from Preparatory Example 1 and 17 parts of ammonium hydroxide solution. The bottle was placed on a roller to equilibrate at ambient condition for 48 h. A clear 18.9 wt % partially neutralized poly(acrylic acid) ammonium salt aqueous solution (pH 8) was obtained.

TABLE 3

Lithium and Ammonium Salts of Acrylic Acid Copolymers

| Polymer Solution Number | (Co)Polymer | Composition | Wt % Solids | pH |
|---|---|---|---|---|
| 1A | Li-pAA (85% neutralized) | (co)polymer of 85 mole % lithium acrylate, 15 mole % acrylic acid | 10.13 | 7 |
| 1B | Li-pAA (70% neutralized) | (co)polymer of 70 mole % lithium acrylate, 30 mole % acrylic acid | 11.30 | 6 |
| 1C | Li-pAA (75% neutralized) | (co)polymer of 75 mole % lithium acrylate, 25 mole % acrylic acid | 8.6 | 6.5 |
| 3 | Li-p(AA/AN 90/10) | (co)polymer of 90 wt % acrylic acid, 10 wt % acrylonitrile | 12.30 | 6 |
| 4 | Li-p(AA/AN 80/20) | (co)polymer of 80 wt % acrylic acid, 20 wt % acrylonitrile | 12.60 | 5.5 |
| 5 | Li-p(AA/AN 70/30) | (co)polymer of 70 wt % acrylic acid, 30 wt % acrylonitrile | 10.64 | 6 |
| 6 | Li-p(AA/AN 60/40) | (co)polymer of 60 wt % acrylic acid, 40 wt % acrylonitrile | 14.31 | 5 |
| 7 | Li-p(AA/AN 50/50) | (co)polymer of 50 wt % acrylic acid, 50 wt % acrylonitrile | 13.80 | 6 |
| 8 | Li-p(AA/MA 90/10) | (co)polymer of 90 wt % acrylic acid, 10 wt % methyl acrylate | 16.29 | 8 |
| 9 | Li-p(AA/NVC 90/10) | (co)polymer of 90 wt % acrylic acid, 10 wt % N-vinylcaprolactam | 16.25 | 6.5 |
| 10 | Li-p(AA/HEA 90/10) | (co)polymer of 90 wt % acrylic acid, 10 wt % 2-hydroxyethyl acrylate | 16.00 | 6.5 |
| 11 | Li-p(AA/ THF-A 90/10) | (co)polymer of 90 wt % acrylic acid, 10 wt % tetrahydrofurfuryl acrylate | 16.08 | 6.5 |
| 12 | Li-p(AA/Am 90/10) | (co)polymer of 90 wt % acrylic acid, 10 wt % acrylamide | 8.46 | 6 |
| 13 | Li-p(AA/VPA 90/10) | (co)polymer of 90 wt % acrylic acid, 10 wt % vinylphosphonic acid | 8.02 | 6 |
| 14 | $NH_4$-pAA | Ammonium Polyacrylate | 18.9 | 6.5 |

Preparation of Cross-Linked Polymer Coated Si Active Materials

Comparative Example CE1

Silicon alloy composite particles having the formula $Si_{76}Fei_{14}C_{11}$ were prepared using procedures disclosed in U.S. Pat. Nos. 8,071,238 and 7,906,238, after which the alloy particles were coated with carbon.

Comparative Example CE2

Silicon alloy composite particles having the formula $Si_{76}Fe_{14}C_{11}$ were prepared using procedures disclosed in U.S. Pat. Nos. 8,071,238 and 7,906,238, after which the alloy particles were coated with carbon and mechanically mixed with graphite.

Example 1

In a typical slurry fabrication process, silicon alloy composite particles from CE1 (38.6 g), SuperP (0.2 g), Polymer Solution IB (10.61 g) and diluent DI water (7.58 g) were first charged into a 150 mL THINKY mixing vessel to target 3 wt % of polymer to silicon alloy ratio. The composition was mixed in the mixer at 2000 rpm for 3 min.

After that, crosslinker EPOCROS WS-500 (0.21 g, Nippon Shokubai Co., Ltd., 21. 1 wt %) was added into the well mixed slurry to target 4 wt % crosslinker to crosslinkable polymer ratio. The slurry composition was mixed one more time at 2000 rpm for 1 min before coating onto a release liner using a Hirano coater (Model TM-MC, from HIRANO TECSEED Co., Ltd.) with a coating gap of 100 μm, a coating speed of 1.0 m/min, and a drying temperature of 110° C. The web prepared "crosslinked polymer coated Si active material" was subsequently delaminated from the release liner and roller milled in a 4 oz jar with ¼" stainless steel media at 10 g solids to 150 g media loadings. The milling vessel was rolled at 52% critical speed for 4 hours.

Examples 2-40 were prepared using the same procedure as Example 1, with the following modifications. Alternative crosslinker and optionally varying crosslinker loadings were used, and are indicated in Table 4. KS6 was added as an alternative additive at the expense of reduced silicon active materials loadings in Examples 10 and 11. DI water/dimethylformamide mixtures were selected as the diluent for Examples 23-26 & 31. N-methylpyrrolidone was selected as the diluent for Examples 34-36. Examples 1-40 were all milled for 4 hours; additional replicates of Example 21 were milled for 0.5 hour, 1 hour, and 2 hours.

TABLE 4

Negative Electrode Compositions

| Example | SiliconActive Material Loading (wt %) | Polymer Solution Number | Polymer Loading (wt %) | X-linker Choice | X-linker Loading (wt %) | Other Additives and Loadings (wt %) |
|---|---|---|---|---|---|---|
| Ex. 1 | 96.4 | 1B | 3.0 | ws-500 | 0.11 | 0.5 wt % SuperP |
| Ex. 2 | 96.4 | 1A | 3.0 | ws-500 | 0.12 | 0.5 wt % SuperP |
| Ex. 3 | 96.4 | 1B | 3.0 | PZ-502 | 0.12 | 0.5 wt % SuperP |
| Ex. 4 | 96.4 | 1B | 3.0 | PZ-502 | 0.06 | 0.5 wt % SuperP |
| Ex. 5 | 96.5 | 1B | 3.0 | PZ-502 | 0.03 | 0.5 wt % SuperP |
| Ex. 6 | 96.5 | 1B | 3.0 | None | 0 | 0.5 wt % SuperP |
| Ex. 7 | 96.4 | 1B | 3.0 | XR-13-554 | 0.12 | 0.5 wt % SuperP |
| Ex. 8 | 96.4 | 1B | 2.9 | PZ-28 | 0.13 | 0.5 wt % SuperP |
| Ex. 9 | 96.4 | 1B | 3.0 | K2030E | 0.11 | 0.5 wt % SuperP |
| Ex. 10 | 83.4 | 1B | 3.0 | PZ-502 | 0.12 | 0.5 wt % SuperP; 13.0 wt % KS6 |
| Ex. 11 | 89.9 | 1B | 3.0 | PZ-502 | 0.12 | 0.5 wt % SuperP; 6.5 wt % KS6 |
| Ex. 13 | 96.4 | 11 | 3.0 | PZ-502 | 0.12 | 0.5 wt % SuperP |
| Ex. 14 | 96.4 | 9 | 3.0 | PZ-502 | 0.12 | 0.5 wt % SuperP |
| Ex. 15 | 96.3 | 8 | 3.0 | PZ-502 | 0.17 | 0.5 wt % SuperP |
| Ex. 16 | 96.4 | 12 | 3.0 | PZ-502 | 0.13 | 0.5 wt % SuperP |
| Ex. 19 | 96.4 | 13 | 3.0 | PZ-502 | 0.12 | 0.5 wt % SuperP |
| Ex. 20 | 96.4 | 10 | 3.0 | Bayhydur 302 | 0.11 | 0.5 wt % SuperP |
| Ex. 21 | 96.4 | 1B | 3.0 | PZ-502 | 0.12 | 0.5 wt % SuperP |
| Ex. 23 | 96.3 | 3 | 3.0 | PZ-502 | 0.15 | 0.5 wt % SuperP |
| Ex. 24 | 96.3 | 4 | 3.0 | PZ-502 | 0.15 | 0.5 wt % SuperP |
| Ex. 25 | 96.4 | 5 | 3.0 | PZ-502 | 0.12 | 0.5 wt % SuperP |
| Ex. 26 | 96.3 | 7 | 3.0 | PZ-502 | 0.15 | 0.5 wt % SuperP |
| Ex. 28 | 96.3 | 1B | 3.0 | PZ-28 | 0.22 | 0.5 wt % SuperP |
| Ex. 29 | 96.1 | 1B | 3.0 | PZ-28 | 0.35 | 0.5 wt % SuperP |
| Ex. 31 | 96.3 | 6 | 3.0 | PZ-502 | 0.15 | 0.5 wt % SuperP |
| Ex. 34 | 96.4 | PE14 | 3.0 | Bayhydur 302 | 0.15 | 0.5 wt % SuperP |
| Ex. 35 | 96.3 | PE15 | 3.0 | XR-13-554 | 0.15 | 0.5 wt % SuperP |
| Ex. 39 | 96.3 | Kuraray R-235 | 3.2 | None | 0 | 0.5 wt % SuperP |
| Ex. 40 | 96.5 | 1A | 0.9 | Kuraray R-235 | 2.1 | None |

Example 41

In a typical slurry fabrication process, Polymer Solution 1C (233 parts), Polymer Solution 14 (26.5 parts), and Poly(Vinyl Alcohol) Solution (R-235, 74 parts) were first dissolved in DI water (690.5 parts) in a 4 L plastic bottle under mechanical agitation from an air mixer and a 4-inch (10 cm) Cowles Blade for 30 min. Silicon alloy composite particles from CE1 (835 parts), additives KS6 (130 parts) and SuperP (5 parts) were then slowly added to the vessel and mixed for 1 hour to make a slurry with 50% solids. The aqueous slurry was stored on a roller prior to subsequent processing.

The slurries were dried with a customized MODEL 48 mixed flow spray dryer fabricated by Spray Drying Systems, Inc. (Eldersburg, Md., US). The spray dryer was 4 feet in diameter and had 8 feet straight sides. The spray dryer operated in closed loop mode under nitrogen. The bulk drying gas temperature at the chamber inlet was approximately 100° C., and at the outlet was 60° C. The aqueous slurry was provided at a feed rate of 30 g/min via a peristaltic pump. The slurry was atomized vertically upward utilizing externally mixed two-fluid pressure spray atomizing nozzles (available from Spraying Systems Co. (Wheaton, Ill., US), under the trade designations "FLUID CAP 60100" and "AIR CAP 170." The atomizing gas was nitrogen at 60 psi (414 kPa). The composition of the coating is provided in Table 5.

The spray dried, crosslinked polymer coated Si alloy particles were finally annealed in quartz boats in a tube furnace under argon at 250° C. for 3 hours. The coating polymer has the following generic expression, in which x equals the mass ratio of Li-pAA in the final composition; y equals the mass ratio of $NH_4$pAA in the final composition; and z equals the mass ratio of PVA in the final composition. The sum of x, y and z is the total polymer loading in the final composition.

$$x\text{LiPAA}+y\text{NH}_4\text{PAA}+z\text{PVA}$$

Examples 42-44 were prepared using the same procedure as Example 41, but with varying ratios of x, y, and z. The detailed compositions and corresponding processing conditions for Examples 41-44 are tabulated in Table 5.

TABLE 5

Negative Electrode Compositions

| Example | x | y | z | Polymer Loading (wt %) | Slurry Concentration (wt %) | Flow Rate (g/min) |
|---|---|---|---|---|---|---|
| Ex. 41 | 0.2 | 0.17 | 0.5 | 3.0 | 51 | 29 |
| Ex. 42 | 0.2 | 0.05 | 0.2 | 3.0 | 44.5 | 25 |
| Ex. 43 | 0.2 | 0.17 | 2.0 | 12.0 | 28.3 | 10 |
| Ex. 44 | 0.2 | 0.05 | 0.6 | 12.0 | 30.1 | 5 |

Particle Size Distribution Measurements

The particle size distributions for cross-linked polymer coated Si active material Examples 1-44 and Comparative Examples CE1 and CE2 were measured by laser light diffraction using a LA-960 Laser Particle Size Analyzer (HORIBA Instruments, Kyoto, Japan) in either DI water or organic solvent with a circulation speed of 4, an agitation speed of 4 and a 3 min sonication at power 4 prior to each data collection. 0.2 g of sample was first dispersed with 10 g of DI water or isopropanol in a 20 mL scintillation vial. The dispersed sample was then added into the instrument to 90-80% T before taking each measurement.

Without being bound by theory, a stable particle size in DI water or organic solvent is interpreted herein as evidence of effective cross-linking of the polymer coatings. Table 6 compares the particle size distribution (PSD) for CE1 and Examples 1-11 in DI water and in isopropanol. The effectiveness of the crosslinked polymer coatings toward maintaining the PSD of the polymer coated silicon active materials was evidenced by the presence of Si alloy agglomerates with D10 greater than 1 μm in both dispersants. Surprisingly, Li-PAA of lower pH ~6 was more effective toward crosslinking than Li-PAA of higher pH ~7 under comparable conditions. More surprisingly, multifunctional aziridine cross-linkers were more effective toward cross-linking LiPAA coatings than oxazoline-, or carbodiimide-based crosslinkers.

TABLE 6

Particle Size Distribution of Crosslinked Polymer Coated Si Anode Materials

| | PSD in water | | | PSD in isopropanol | | |
|---|---|---|---|---|---|---|
| | D10 | D50 | D90 | D10 | D50 | D90 |
| CE1 | 0.73 | 2.41 | 6.13 | 0.93 | 2.69 | 5.46 |
| Ex. 1 | 0.77 | 3.06 | 6.24 | 2.09 | 5.53 | 10.13 |
| Ex. 2 | 0.81 | 3.32 | 7.28 | 1.97 | 4.94 | 8.97 |
| Ex. 3 | 1.59 | 4.68 | 8.7 | 1.63 | 4.51 | 8.55 |
| Ex. 4 | 0.76 | 3.79 | 9.87 | 1.75 | 3.82 | 6.46 |
| Ex. 5 | 0.72 | 2.87 | 5.92 | 1.69 | 3.18 | 5.07 |
| Ex. 6 | 0.67 | 3.44 | 7.75 | 2.34 | 4.47 | 7.2 |
| Ex. 7 | 0.75 | 3.34 | 7.01 | 1.6 | 3.29 | 5.5 |
| Ex. 8 | 1.34 | 4.81 | 9.68 | 1.34 | 4.81 | 9.68 |
| Ex. 9 | 0.83 | 4.23 | 10.28 | 0.83 | 4.23 | 10.28 |
| Ex. 10 | 1.86 | 5.04 | 10.63 | 1.86 | 5.04 | 10.63 |
| Ex. 11 | 1.12 | 3.58 | 7.64 | 1.12 | 3.58 | 7.64 |

Table 7 compares the effect of polymer choice and cross-linker pairing toward the preparation of cross-linked polymer coated Si active materials. For acrylic acid-based copolymers, regardless of the copolymer choice, stable Si active material agglomerates were obtained when acid (co)polymer (pH 6 at 10 wt % in aqueous solutions) was paired with multifunctional aziridine cross-linkers.

TABLE 7

Particle Size Distribution of Crosslinked Polymer Coated Si Anode Materials

| | PSD in water | | |
|---|---|---|---|
| Sample Number | D10 | D50 | D90 |
| CE1 | 0.73 | 2.41 | 6.13 |
| Ex. 13 | 0.98 | 3 | 5.91 |
| Ex. 14 | 0.9 | 2.94 | 6.04 |
| Ex. 15 | 1.02 | 3.04 | 5.88 |
| Ex. 16 | 1.48 | 3.96 | 7.16 |
| Ex. 17 | 0.93 | 3.03 | 6.09 |
| Ex. 18 | 0.96 | 3.01 | 5.83 |
| Ex. 19 | 1.07 | 3.95 | 8.11 |
| Ex. 20 | 1.47 | 3.49 | 6.21 |
| Ex. 21 (milled 0.5 hr) | 5.92 | 19.12 | 62.64 |
| Ex. 21 (milled 1 hr) | 3.38 | 11.5 | 21.56 |
| Ex. 21 (milled 2 hr) | 2.08 | 6.22 | 11.5 |
| Ex. 21 (milled 4 hr) | 1.89 | 6.02 | 11.25 |
| Ex. 22 | 0.68 | 1.48 | 4.81 |
| Ex. 23 | 1.59 | 5.6 | 11.18 |
| Ex. 24 | 1.84 | 5.26 | 9.54 |
| Ex. 25 | 0.82 | 3.84 | 8.61 |
| Ex. 26 | 2.11 | 5.74 | 10.64 |
| Ex. 28 | 1.33 | 3.87 | 7.4 |
| Ex. 29 | 1.44 | 4.35 | 8.46 |
| Ex. 31 | 1.43 | 4.35 | 8.58 |
| Ex. 32 | 0.87 | 2.77 | 5.49 |
| Ex. 33 | 0.78 | 3.49 | 8.73 |
| Ex. 40 | 1.44 | 6.17 | 12.62 |

Table 8 compares crosslinked polymer coated silicon active materials with acid-free polymers. Example 34 & 35 were crosslinked using hydroxyl functional groups in the polymer and a multifunctional isocyanate crosslinker (e.g. BAYHYDUR 302). Example 39 comprises polyvinyl alcohol, which forms physical crosslinks via hydrogen bonding.

TABLE 8

| Particle Size Distribution of Crosslinked Polymer Coated Si Anode Materials | | | |
|---|---|---|---|
| | PSD in water | | |
| Sample Number | D10 | D50 | D90 |
| Ex. 34 | 1.05 | 4.08 | 9.42 |
| Ex. 35 | 1.34 | 4.5 | 9.29 |
| Ex. 39 | 1.25 | 3.44 | 6.53 |

Table 9 compares crosslinked polymer coated silicon active materials with $[(Li_{1-x}AH_{4x})PAA]_{1-y}PVA_y$ coatings. The much greater D90 values for Ex. 43 and Ex. 44 in water likely resulted from the swelling of the poly(acrylic acid) based coatings in aqueous media. Nevertheless, greater D10 values was achieved for Ex. 41~Ex. 44 vs. CE1, which is an indication of effective polymer crosslinking.

TABLE 9

| Particle Size Distribution of Crosslinked Polymer Coated Si Anode Materials | | | | | | |
|---|---|---|---|---|---|---|
| | PSD in water | | | PSD in isopropanol | | |
| | D10 | D50 | D90 | D10 | D50 | D90 |
| CE1 | 0.73 | 2.41 | 6.13 | 0.93 | 2.69 | 5.46 |
| Ex. 41 | 5.1 | 7.8 | 11.4 | 5.5 | 8.7 | 13.1 |
| Ex. 42 | 5.5 | 8.8 | 13.4 | 5.6 | 8.8 | 13.4 |
| Ex. 43 | 7.1 | 18.2 | 72.1 | 5.4 | 10.6 | 19.7 |
| Ex. 44 | 8.1 | 24.2 | 85.4 | 6.6 | 11.1 | 18.2 |

Preparation of Anode Coatings and Coin Half-Cells

Electrolyte

The electrolyte used in half-cell preparation was a mixture of 90 wt % of a 1 M solution of $LiPF_6$ in 3:7 (w/w) ethylene carbonate:ethyl methyl carbonate (SELECTILYTE LP 57 available from BASF, USA) and 10 wt % monofluoroethylene carbonate (also available from BASF).

Preparation of Electrode Alloy Slurry

The cross-linked polymer coated Si alloy of examples 1-39 were used as silicon active materials for the preparation of composite electrodes with CMC/SBR binder. In a typical slurry fabrication process, three zirconium beads (diameter 16.5 mm) were first placed inside a 150 mL THINKY mixing vessel. Slurry components silicon alloy composite particles (1.5 grams), graphite (3.2 g), of conductive carbon SuperP (0.1 g), and 1-propanol aqueous solution (3.85 g 10 wt %) were then added into the mixing vessel. The composition was mixed at 2000 rpm for 1 min. After that, carboxymethylcellulose aqueous solution (5.88 g, Na-CMC, Daicel 2200, Daicel FineChem Ltd., Japan) was added into the mixing vessel, the slurry was mixed one more time at 2000 rpm for 1 min. Styrene-butadiene rubber emulsion (0.25 g, 39.23% solids, SBR, ZEON Corporation, Japan) was finally added before another mixing cycle at 2000 rpm for 1 more minute. The resulting slurry was ready for coating.

Coating of Electrode

The electrode slurries were then coated onto copper foil to prepare working electrodes, using the following procedure. First, a bead of acetone was dispensed on a clean glass plate and overlaid with a sheet of 15 micron copper foil (available from Furukawa Electric, Japan), which was cleaned with acetone. Using a 3-mil (0.076 mm), 4-mil (0.10 mm), or 5 mil (0.13 mm) coating bar and a steel bar guide, the slurry was dispensed onto the coating bar and drawn down in a steady motion. The composite anode coating was then allowed to dry under ambient conditions for 1 hour, after which it was transferred to a dry room with a dew point below −40° C. The coated foil was then dried in a vacuum oven at 120° C. for 2 hours.

Coin Cell Preparation

To prepare half coin cells, working electrodes were punched from the coated copper foil face down, with white paper underneath, using a 16 mm die, and then the paper was removed. Three matching copper foil pieces were punched (bare current collector) and the average mesh weight was determined. Films of CELGARD 2325 separator material (25 micron microporous trilayer PP/PE/PP membrane, Celgard, USA) were placed between sheets of colored paper and punched out using a 20 mm die, removing the paper afterwards. For each cell, at least 2 separators were cut. Both sides of a lithium foil sheet were rolled and brushed, placed between sheets of plastic film, and counter electrodes were punched out using an 18 mm die, after which the plastic film was removed. Each electrode was weighed separately and the total weight was recorded.

Electrochemical 2325 coin cells were then assembled in this order: 2325 coin cell bottom, 30 mil copper spacer, lithium counter electrode, 33.3 microliters electrolyte, separator, 33.3 microliters electrolyte, separator, grommet, 33.3 microliters electrolyte, working electrode (face down and aligned with lithium counter electrode), 30 mil copper spacer, 2325 coin cell top. The cell was crimped and labelled.

Characterization of Electrochemical Performance

The coin cells were then cycled using a SERIES 4000 Automated Test System (available from Maccor Inc, USA) according to the following protocol.

Cycle 1: Discharge to 0.005V at C/10, trickle discharge to C/40 followed by 15 minutes rest. Charge to 1.5V at C/10 followed by 15 min rest.

Cycles 2-100: Discharge to 0.005V at C/4, trickle discharge to C/20 followed by 15 min rest. Charge to 0.9V at C/4 followed by 15 min rest.

The discharge capacity retention over the 100 test cycles was recorded and plotted.

Electrochemical Cycling Results of Half-Cells

FIG. 1 shows normalized discharge capacity as a function of cycle number for lithium half cells prepared as described earlier using crosslinked polymer coated Si active materials Examples 23, 24, 25, 26 and 31 in composite anodes comprising Si active materials/graphite/SuperP/CMC/SBR in a weight ratio of 30/64/2/2/2. Example 25 with cross-linked Li-p(AA/AN 70/30) coating exhibited superior normalized capacity retention to other examples with cross-linked Li-p(AA/AN) coatings of different AA/AN ratios.

Figure 2:
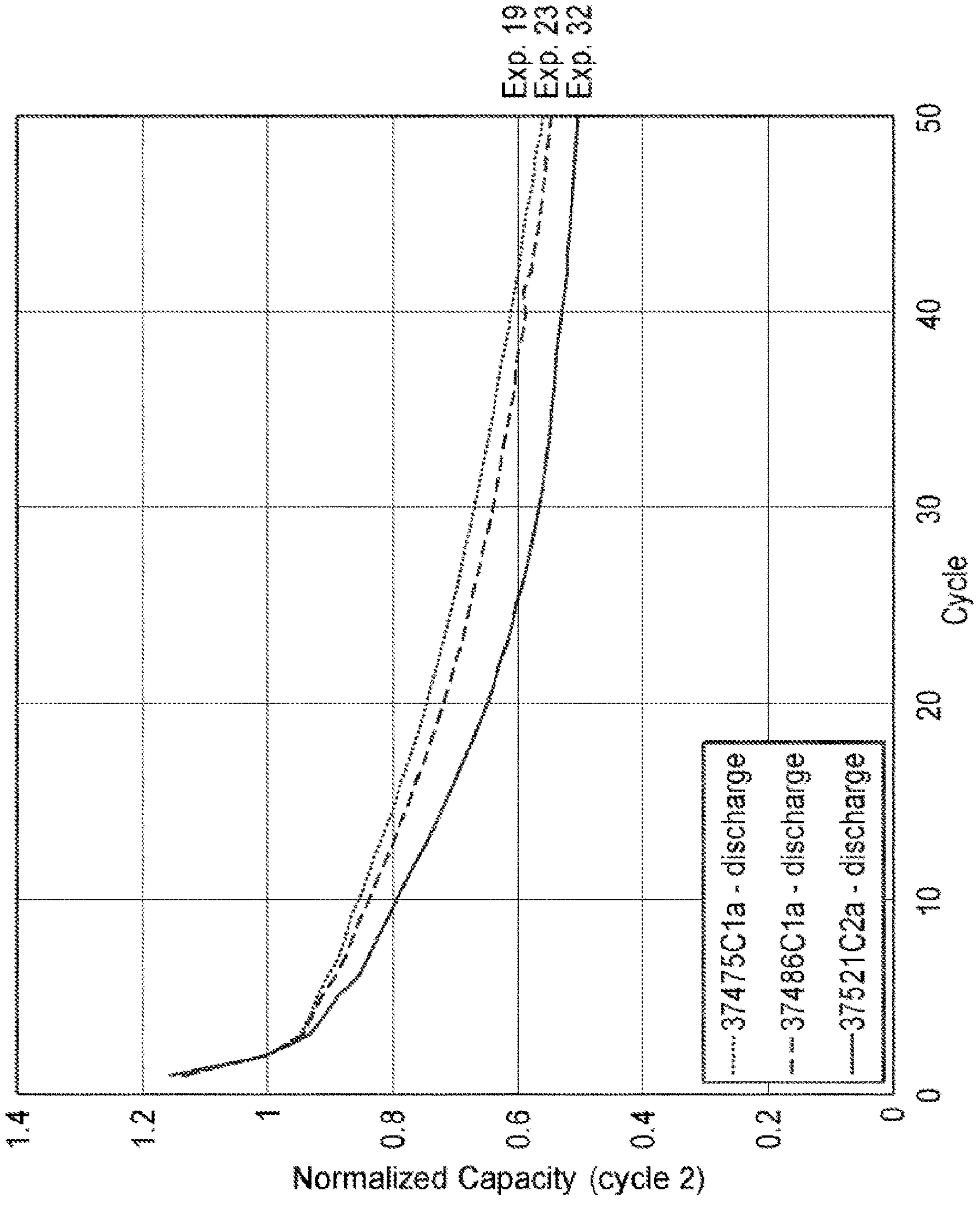
FIG. 2 is a graph of results of electrochemical cycling for lithium half-cells prepared using embodiments of the present disclosure.

FIG. 2 compares normalized discharge capacity as a function of cycle number for lithium half cells prepared as described earlier using crosslinked polymer coated Si active materials Examples 19, 23 and 32 in composite anodes comprising Si active materials/graphite/SuperP/CMC/SBR in a weight ratio of 30/64/2/2/2. The crosslinked polymer coatings in these examples all comprise 90 wt % combined acrylic acid and lithium acrylate contents and 10 wt % of varying co-monomers. At this co-monomer loading, Example 19 with cross-linked Li-p(AA/VPA 90/10) coating exhibited slightly better normalized capacity retention than Example 23 with cross-linked Li-p(AA/AN 90/10) coating.

Figure 3:
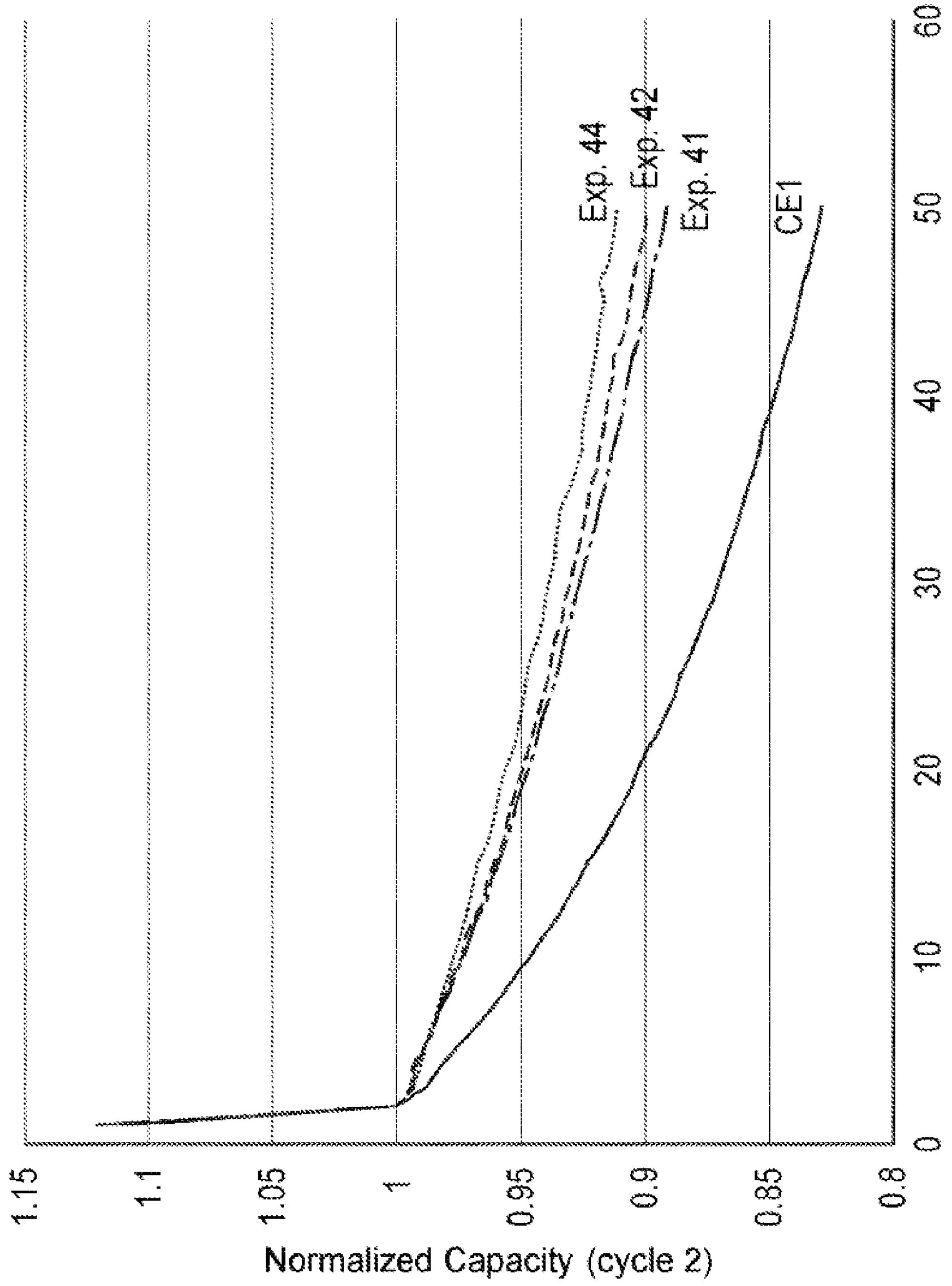
FIG. 3 is a graph of results of electrochemical cycling for lithium half-cells prepared using embodiments of the present disclosure.

FIG. 3 compares normalized discharge capacity as a function of cycle number for lithium half cells prepared as described earlier using crosslinked polymer coated Si active materials Examples 41, 42 and 44 vs. CE1 in composite anodes made from Si active materials/graphite/SuperP/CMC/SBR in a weight ratio of 30/64/2/2/2. All crosslinked polymer coated Si active materials exhibited better normalized capacity retention than the bare Si active material, Comparative Example CE1. Higher total polymer loading of 12% in Example 44 might have contributed to better cycling performance for Example 44 compared to Examples 41 and 42, both of which comprised 3% polymer loadings.

Although specific embodiments have been illustrated and described herein for purposes of description of some embodiments, it will be appreciated by those of ordinary skill in the art that a wide variety of alternate and/or equivalent implementations may be substituted for the specific embodiments shown and described without departing from the scope of the present disclosure.

What is claimed:

1. A method of making a negative electrode composition, the method comprising:

preparing and mixing a slurry comprising: a polymer containing material and a crosslinking containing material in an aqueous solvent;

adding and mixing a silicon containing material;

drying under an inert atmosphere, and annealing under an insert atmosphere to provide the negative electrode composition, wherein the silicon containing material is in the form of grains having a Sherrer grain size of less than 50 nm, being free of doped lithium, the negative electrode composition has a surface area of less than 20 $m^2/g$;

the polymer containing material is a vinylic monomer comprising one or more functional groups selected from the group comprising vinyl groups, propargyl groups, azide groups, carboxylic acid groups, phosphonic acid groups, hydroxyl groups, N-methylolamido groups or alkoxysilyl groups;

the crosslinking containing material is an aziridine.

2. The method of claim 1, wherein in addition to the silicon containing material, one or more additional electrochemically active materials are added selected from the group comprising one or more of graphite, binders, conductive diluents, fillers, adhesion promoters, thickening agents for dispersion viscosity modifications or any combinations thereof.

3. The method of claim 2, wherein the graphite is present in the negative electrode composition in an amount of greater than 10 wt. %, greater than 20 wt. %, greater than 50 wt. %, greater than 70 wt. % or greater, based upon the total weight of the negative electrode composition.

4. The method of claim 2, wherein the graphite is present in the negative electrode composition in an amount of between 20 wt. % and 90 wt. %, between 30 wt. % and 80 wt. %, between 40 wt. % and 60 wt. %, between 45 wt. % and 55 wt. %, between 80 wt. % and 90 wt. %, or between 85 wt. % and 90 wt. %, based upon the total weight of the electrode composition.

5. The method of claim 2, wherein the binder is selected from the group comprising one or more of styrene-butadiene-rubber/sodium carboxymethylcellulose, acrylic acid (co)polymers and their alkali metal salts, fluoropolymer/acrylic (co)polymer blends.

6. The method of claim 5, wherein the binder is present in the electrode composition in an amount of less than 50 wt. %, less than 40 wt. %, less than 30 wt. %, less than 20 wt. %, less than 10 wt. %, less than 5 wt. %, less than 1 wt. %, or less than 0.1 wt. %, based on the total weight of the binder.

7. The method of claim 1, wherein the vinylic monomer is selected from one or more additional or alternative cross-linkable vinylic monomers which may include allyl (meth)acrylate, 2-hydroxyethyl (meth)acrylate, 3-trimethoxysilylpropyl(meth)acrylate, and 3-triethoxysilylpropyl (meth)acrylate or any combinations thereof.

8. The method of claim 1, wherein in addition to the vinylic monomers, the vinylic monomers may be selected from the group comprising monofunctional vinylic monomers, alkali metal salts of (meth)acrylic acid, alkyl esters or amides of (meth)acrylic acid containing 1 to 18 carbon atoms in the alkyl group, methyl (meth)acrylate or 2 ethylhexyl (meth)acrylate or stearyl (meth)acrylate or dimethylacrylamide, or substituted alkyl esters or amides of (meth) acrylic acid, hydroxyethyl acrylate or tetrahydrofurfuryl acrylate or glycidyl methacrylate or methoxy-poly(ethylene glycol)(meth)acrylate.

9. The method of claim 8, wherein the monofunctional vinylic monomers are selected from the group comprising one or more styrenic compounds selected from styrene, alpha-methyl styrene; N-vinylimidazole; 4-vinylpyridine; organic nitriles selected from the group comprising acrylonitrile; N-vinylcaprolactam, or N-vinylpyrrolidone; vinylphosphonic acid; or fluorine-containing vinylic monomers.

10. The method of claim 1, wherein the silicon containing material is selected from the group comprising elemental silicon, silicon oxide, silicon carbide, or a silicon containing alloy.

11. The method of claim 10, wherein the silicon containing alloy in which the silicon has the formula: SixMyCz, where x, y, and z represent atomic % values and (a) $x+y+z=100\%$; (b) $x>2y+z$; (c) x and y are greater than 0; z is equal to or greater than 0; (d) M is iron and optionally one or more other metals selected from manganese, molybdenum, niobium, tungsten, tantalum, copper, titanium, vanadium, chromium, nickel, cobalt, zirconium, yttrium, or combinations thereof.

12. The method of claim 11, wherein $65\%\leq x\leq 85\%$, $70\%\leq x\leq 80\%$, $72\leq x\leq 74\%$, or $75\leq x\leq 77\%$; $5\%\leq y\leq 20\%$, $14\leq y\leq 7\%$, or $13\leq y\leq 14\%$; and $5\%\leq z\leq 15\%$, $5\%\leq z\leq 8\%$, or $9\leq z\leq 12\%$.

13. The method of claim 11, wherein x, y, and z are greater than 0.

14. The method of claim 1, wherein the negative electrode composition is in the form of particles having a D10 of at least 0.5 μm, at least 1.0 μm, at least 1.5 μm, at least 2 μm, at least 2.5 μm, at least 3.0 μm, or at least 5.0 μm; a D50 of no greater than 20 μm, no greater than 10 μm, no greater than 7 μm, no greater than 5 μm, or no greater than 3 μm; and D90 of no greater than 50 μm, no greater than 40 μm, no greater than 30 μm, no greater than 25 μm, no greater than 20 μm, no greater than 15 μm, or no greater than 10 μm.

15. The method of claim 1, wherein the negative electrode composition is in the form of particles and has a surface area of less than less than 12 $m^2/g$, less than 10 $m^2/g$, less than 5 $m^2/g$, less than 4 $m^2/g$, or even less than 2 $m^2/g$.

16. The method of claim 1, wherein the silicon containing material is coated with one or more coatings disposed on and at least partially surrounding the silicon containing material.

* * * * *